(12) United States Patent
Sehgal et al.

(10) Patent No.: US 8,440,598 B2
(45) Date of Patent: *May 14, 2013

(54) INK CLEANING COMPOSITION AND METHODS FOR USE

(75) Inventors: Amit Sehgal, Marlton, NJ (US); David Fluck, Elkton, MD (US); Ruela Talingting Pabalan, Burlington, NJ (US); Satyen Trivedi, East Windsor, NJ (US); Charles Aymes, Monmouth Junction, NJ (US)

(73) Assignee: Rhodia Operations, Aubervilliers (FR)

( * ) Notice: Subject to any disclaimer, the term of this patent is extended or adjusted under 35 U.S.C. 154(b) by 227 days.

This patent is subject to a terminal disclaimer.

(21) Appl. No.: 12/799,402

(22) Filed: Apr. 23, 2010

(65) Prior Publication Data

US 2010/0273695 A1   Oct. 28, 2010

Related U.S. Application Data

(63) Continuation of application No. 12/387,887, filed on May 8, 2009.

(60) Provisional application No. 61/127,021, filed on May 9, 2008, provisional application No. 61/188,760, filed on Aug. 12, 2008, provisional application No. 61/191,897, filed on Sep. 12, 2008, provisional application No. 61/212,545, filed on Apr. 13, 2009.

(51) Int. Cl.
*C11D 9/26* (2006.01)

(52) U.S. Cl.
USPC .............................. 510/174; 510/435; 8/137

(58) Field of Classification Search .................. 510/435; 8/137
See application file for complete search history.

(56) References Cited

U.S. PATENT DOCUMENTS

| 4,470,928 A | 9/1984 | Kimura et al. ............. 260/239.3 |
| 4,673,524 A | 6/1987 | Dean ............................ 252/118 |

(Continued)

FOREIGN PATENT DOCUMENTS

| WO | WO 94/17145 | 8/1994 |
| WO | WO 01/30957 A1 | 10/2000 |

(Continued)

OTHER PUBLICATIONS

F M Ghuiba & O M O Habib, "The Use of Egyptian Fusel Oil for the Preparation of Some Plasticizers Compatible with Polyvinyl Chloride", Indian Journal of Technology, vol. 23, Aug. 1985, pp. 309-311.

(Continued)

*Primary Examiner* — Harold Pyon
*Assistant Examiner* — Katie L Hammer

(57) ABSTRACT

An environmentally-friendly cleaning composition for industrial and consumer applications comprising (a) a blend of dibasic esters, (b) one or more surfactants (c) and, optionally, (d) water or a solvent. The dibasic esters are be derived from a blend of adipic, glutaric, and succinic diacids, and, in one particular embodiment, the blend comprises dialkyl adipate, dialkyl methylglutarate and dialkyl ethylsuccinate, wherein the alkyl groups individually comprise a $C_1$-$C_{12}$ hydrocarbon group. The one or more surfactants are typically chosen from alcohol alkoxylate, an alkyl phenol ethoxylate, a terpene, a terpene alkoxylate or any derivates thereof. Optionally, additional components or additives including delaminates such as pinene and d-limonene, fragrances, whiteners, stabilizers, thickeners and the like can be added to the composition. The industrial or consumer application selected from the group consisting of a graffiti cleaner, a painted-substrate cleaner, an ink cleaner, a metal substrate cleaner, a plastic substrate cleaner, an environmentally friendly cleaner, a stain-spot cleaner, an industrial hand cleaner, a resin cleaner, a tar resin cleaner, a textile cleaner, a paint stripper and any combination thereof.

5 Claims, 17 Drawing Sheets

U.S. PATENT DOCUMENTS

| | | | | |
|---|---|---|---|---|
| 4,934,391 | A | 6/1990 | Futch et al. | 134/40 |
| 5,024,780 | A | 6/1991 | Leys | 252/162 |
| 5,252,780 | A | 10/1993 | Ramos et al. | 174/161 R |
| 5,419,848 | A | 5/1995 | Van Eenam | 252/164 |
| 5,573,710 | A | 11/1996 | McDonnell | 510/405 |
| 5,672,579 | A | 9/1997 | Diaz et al. | 510/405 |
| 6,165,962 | A * | 12/2000 | Kaler et al. | 510/365 |
| 6,172,031 | B1 | 1/2001 | Stevens | 510/417 |
| 6,261,381 | B1 * | 7/2001 | Wojcik | 134/42 |
| 6,284,720 | B1 | 9/2001 | Opre | 510/170 |
| 6,306,223 | B1 | 10/2001 | Joye | 134/28 |
| 6,355,113 | B1 | 3/2002 | Nalewajek et al. | 134/26 |
| 6,544,348 | B1 * | 4/2003 | Stockigt et al. | 134/40 |
| 6,706,676 | B2 | 3/2004 | Swensen | 510/174 |
| 7,199,092 | B2 | 4/2007 | Lu et al. | 510/238 |
| 7,271,140 | B2 | 9/2007 | Durrant | 510/276 |
| 7,309,684 | B2 | 12/2007 | Filippini et al. | 510/201 |
| 2003/0216268 | A1 | 11/2003 | Swensen | 510/174 |
| 2004/0000329 | A1 | 1/2004 | Albu et al. | 134/38 |
| 2004/0200007 | A1 | 10/2004 | Heim | 8/148 |
| 2006/0135683 | A1 | 6/2006 | Adam et al. | 524/556 |
| 2007/0093404 | A1 | 4/2007 | Gross et al. | 510/407 |

FOREIGN PATENT DOCUMENTS

| | | |
|---|---|---|
| WO | WO 2005/028606 A1 | 3/2005 |
| WO | WO 2006/055713 A1 | 5/2006 |

OTHER PUBLICATIONS

Solo Pak Pty Ltd, "Earth Renewable Heavy Duty Degreaser", Material Safety Data Sheet, pp. 1-6 Sep. 25, 2008.

* cited by examiner

FIG. 2

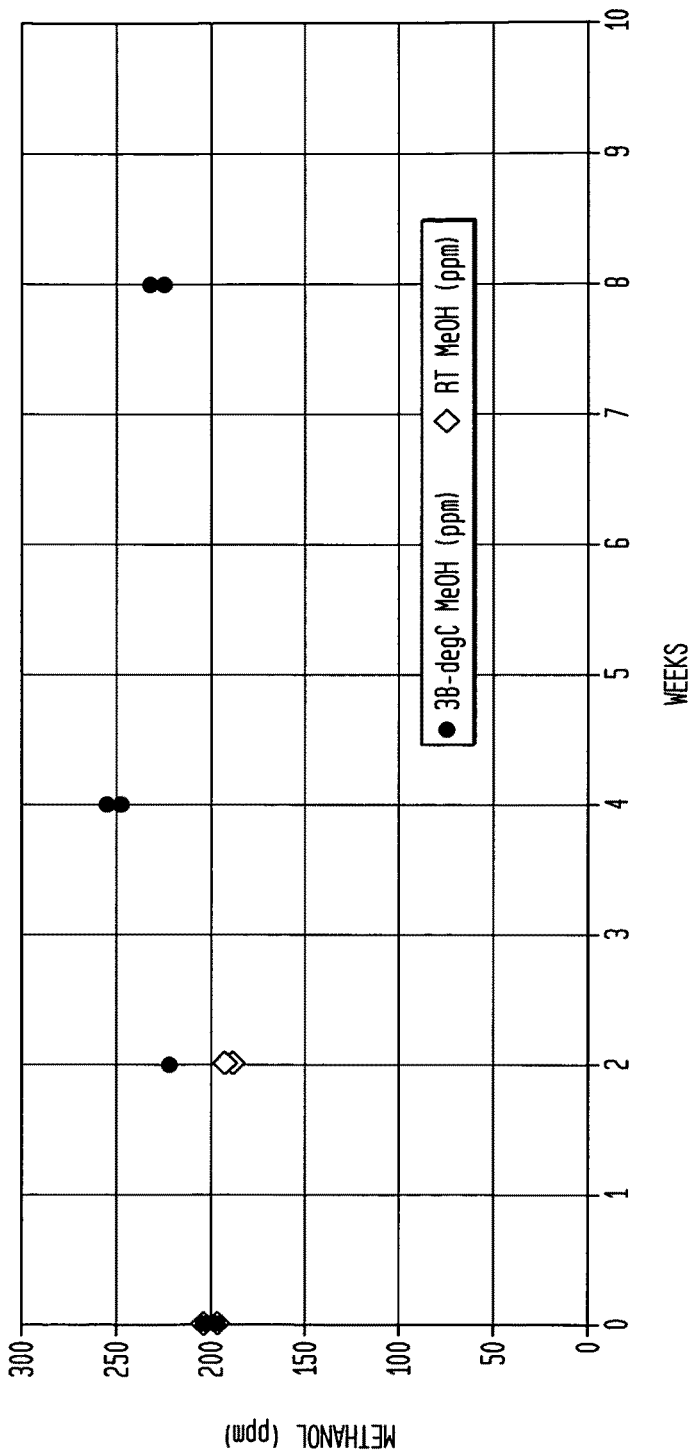

INK CLEANING COMPOSITION AND METHODS FOR USE

CROSS-REFERENCE TO RELATED APPLICATIONS

The application is a continuation of application of U.S. application Ser. No. 12/387,887, filed May 8, 2009, hereby incorporated by reference, which claims benefit of U.S. Provisional Application No. 61/127,021, filed on May 9, 2008; U.S. Provisional Application No. 61/188,760, filed on Aug. 12, 2008; U.S. Provisional Application No. 61/191,897, filed on Sep. 12, 2008; U.S. Provisional Application No. 61/212,545, filed Apr. 13, 2009; all herein incorporated by reference.

FIELD OF THE INVENTION

This invention relates to cleaning compositions that are environmentally friendly, biodegradable, non-toxic and non-flammable with low odor, low vapor pressure and low volatile organic compound (VOC) content and, more particularly, cleaning compositions utilized for multiple consumer and industrial applications.

BACKGROUND OF THE INVENTION

Many commercially available cleaners incorporate environmentally hazardous and toxic volatile organic compounds (VOCs). It has been found that VOCs are linked to ozone formation and contributed significantly other health hazards. In the printing industry, for example many cleaning solutions contain high VOC solvents include toluene, xylene, methyl ethyl ketone, glycol ethers, tetrachloroethylene, methyl isobutyl ketone, methanol, 1,1,1-trichloroethane, dichloromethane and ethylene glycol. Many ink cleaning compositions contain aromatic compounds that are in many cases hazardous air pollutants (HAPs) or are not environmentally friendly in that they do not biodegrade well. Often these solvents are low vapor pressure solvents with low flashpoints that makes them extremely flammable. Such compositions are undesirable in light of the increased awareness for human exposure to toxic materials and the demand for environmentally friendly, non-toxic solvents. However, the drawbacks in utilizing these solvents have not diminished their use.

As another example with respect to surface (e.g., painted surface) cleaners, most commercially available cleaners contain hazardous or aggressive solvents that can remove some stains, but pose health hazards, fire hazards and/or have strong odors. For example, many solvents use aromatic-based compounds such as toluene, xylene, or are glycol ether-based solvents or chlorinated solvents. The use of these and related solvents is also not desirable because of the potential pollution and environmental problems associated with the disposal of such solvents. In addition, cleaners containing aggressive solvents also damages the underlying substrates that are being treated, such as painted surfaces, wood, carpet, and the like. Accordingly, there is an increasing consumer demand for environmentally friendly, biodegradable cleaning products.

As another example, many commercially available textile cleaners respond differently on food or beverage stains on clothing or other textiles. Some stains include cola, coffee, salad dressing, chocolate, mustard, lipstick, ketchup, etc. Most commercially available spot-stain cleaners contain hazardous or aggressive solvents such as NMP (N-methyl pyrrolidinone). These kinds of cleaners may pose health hazards, fire hazards and have strong odors. It is also possible that aggressive formulation may permanently damage clothing and textiles.

As yet another example, many commercially available graffiti cleaners contain high VOC components. Graffiti includes spray paint, marker and the like. Permanent markers are used on many substrates such as paper, writing boards, plastic panels, etc. It is, however, very difficult to completely remove permanent marker from many of these substrates, in particular plastic substrates. Generally, there is currently no satisfactory environmentally friendly cleaner for removing permanent marking pen from these substrate surfaces. Most of the commercially available "eco-friendly" cleaners are generally formulated for cleaning house-hold stains such as pen, crayons, pencils, lipsticks, washable marker and the like, but are not strong enough for hard-to-clean stains such as permanent marker and the like. In addition, even if such cleaners can clean most of the permanent ink from the substrate, in most cases there remains some visible markings on the substrates. On the other hand, other cleaners contain hazardous or aggressive solvents such as NMP (N-methyl pyrrolidinone). These kinds of cleaners may pose health hazards, fire hazards and have strong odors. It is also possible that aggressive formulation may permanently damage the applied-upon substrates.

The availability of environmentally friendly solvents, however, is limited because such alternatives generally do not provide satisfactory performance. A better ecotox profile often leads to a compromise in performance. Because many solvents are flammable and toxic to health, there is a need to develop provide an improved cleaning composition and methods of use which is environmentally friendly and effective at various industrial and consumer cleaning applications.

SUMMARY OF THE INVENTION

The present invention will become apparent from the following detailed description and examples, which comprises in one aspect, is a cleaning composition comprising one or more dibasic esters; one or more surfactants; and, optionally, additional components and/or water. The dibasic esters can be derived from adipic, glutaric, and succinic diacids, or isomers thereof. In one particular embodiment, the dibasic ester blend is comprised of a mixture dialkyl methylglutarate, dialkyl ethylsuccinate and dialkyl adipate, where the alkyl groups individually comprise $C_1$-$C_{12}$ hydrocarbon groups.

In one aspect, the present invention is a cleaning composition comprising (a) a blend of dibasic esters comprising at least one of dialkyl adipate, dialkyl methylglutarate and dialkyl ethylsuccinate, typically a mixture of dialkyl adipate, dialkyl methylglutarate and dialkyl ethylsuccinate, where the alkyl groups individually comprise $C_1$-$C_{12}$ hydrocarbon groups; and (b) a surfactant selected from the group consisting of an anionic surfactant, a cationic surfactant, an amphoteric surfactant, a zwitterionic surfactant, a nonionic surfactant and any combination thereof, wherein the cleaning composition is used for industrial or consumer applications including but not limited to a graffiti cleaner, a painted-substrate cleaner, an ink cleaner, including printer ink, a metal substrate cleaner, a wood surface cleaner, a plastic substrate cleaner, a stain-spot cleaner, a textile cleaner, an industrial hand cleaner, a resin or tar-resin cleaner, a degreaser, a tar cleaner, a paint stripper, or the like, or any combination thereof.

The cleaning composition of the present invention has desirable qualities including one or a combination of being: substantially non-toxic, non-flammable, biodegradable, high flash point, low vapor pressure and low odor; meets the consumer products LVP-VOC exemption criteria established by CARB and the EPA (certain sections).

In another aspect, the present invention is a cleaning composition comprising, based on the total weight of the composition: (a) from about 1% to about 60% by weight a blend of dibasic esters; (b) from about 0.1% to about 65% by weight one or more surfactants; and optionally, (c) water. In another embodiment, the cleaning composition further comprises about 1% to about 12% by weight d-limonene. The cleaning composition of the present invention can be used in a variety of consumer and/or industrial applications.

In another aspect, the present invention is a cleaning composition in the form of a microemulsion comprising: from about 1% to about 60% by weight a blend of dibasic esters; from about 0.1% to about 65% by weight one or more surfactants; and, optionally, water; more typically, from about 5% to about 40% by weight a blend of dibasic esters; (b) from about 5% to about 40% by weight one or more surfactants, typically, one or more nonionic surfactants; and, optionally, (c) water. In another embodiment, the cleaning composition microemulsion further comprises about 1% to about 12% by weight a terpene, terpene EO/PO, pinene or derivative thereof. Optionally, additives such as fragrances and solubilizers, pH adjusting agents, whiteners, delaminates, opacifying agent, anti-corrosion agents, anti-foaming agents, coloring agents, stabilizers and thickeners can be added. The cleaning composition of the present invention is typically in form of a microemulsion and provided as a liquid or spray formulation for use, depending upon the application.

The surfactant can be any number of amphoteric, cationic, anionic or nonionic surfactants or a blend of surfactants. In one embodiment, the surfactant a nonionic surfactant, typically, an alcohol ethoxylate, an alkyl phenol ethoxylate or a terpene alkoxylate. More typically, the surfactant is a $C_7$-$C_{12}$ alcohol ethoxylate, e.g., Rhodasurf 91-6 surfactant manufactured by Rhodia Inc. (Cranbury, N.J.), and most typically, the surfactant is a $C_9$-$C_{11}$ linear alcohol ethoxylate.

In a further aspect, the present invention is an industrial and/or consumer cleaning composition comprising: (a) from about 1% to about 55%, by weight of the cleaning composition, a blend of dibasic esters, wherein the blend comprises:

(i) about 7-14%, by weight of the blend, a diester of formula:

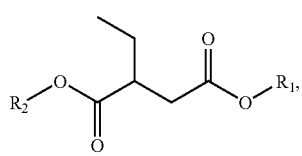

(ii) about 80-94%, by weight of the blend, a diester of formula

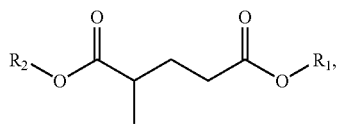

(iii) about 1-5% (by weight of the blend) a diester of formula

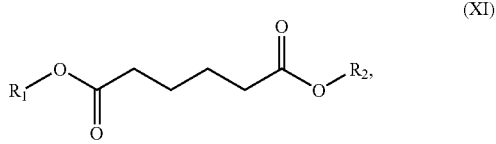

wherein $R_1$ and/or $R_2$ individually comprise a hydrocarbon having from about 1 to about 12 carbon atoms, typically, methyl, ethyl, propyl, isopropyl, butyl, isobutyl, n-butyl or isoamyl; (b) from about 0.1% to about 65%, by weight of the cleaning composition, a surfactant; (c) from about 0% to about 12%, by weight of the cleaning composition, one or more additional components, and (d) from about 2% to about 85%, by weight of the cleaning composition, water.

In another aspect, the invention is a method of cleaning a coated surface comprising: (a) obtaining a cleaning composition comprising: (i) a blend of dibasic esters comprising dialkyl adipate, dialkyl methylglutarate and dialkyl ethylsuccinate; and (ii) a surfactant selected from the group consisting of an anionic surfactant, a cationic surfactant, an amphoteric surfactant, a zwitterionic surfactant, a nonionic surfactant and any combination thereof; (b) contacting the cleaning composition with a coated surface having a stain on said surface; and (c) removing the used cleaning composition from the cleaned coated surface.

The cleaning composition of the present invention is environmentally friendly, with a high flash point, low vapor pressure and low odor; it falls under the consumer products LVP-VOC exemption criteria established by CARB and the EPA (certain sections). The cleaning formulation of the present invention has environmentally friendly characteristics including but not limited to being non toxic, bio-degradable, non-flammable and the like.

BRIEF DESCRIPTION OF FIGURES

FIG. 2 is a photograph comparison of Goof-Off™ with Formulation R0765-41-16 on low gloss paint.

FIG. 17 illustrates the hydrolytic stability of the present invention in terms of methanol concentration monitoring over a period of time.

DETAILED DESCRIPTION

Figure 1:
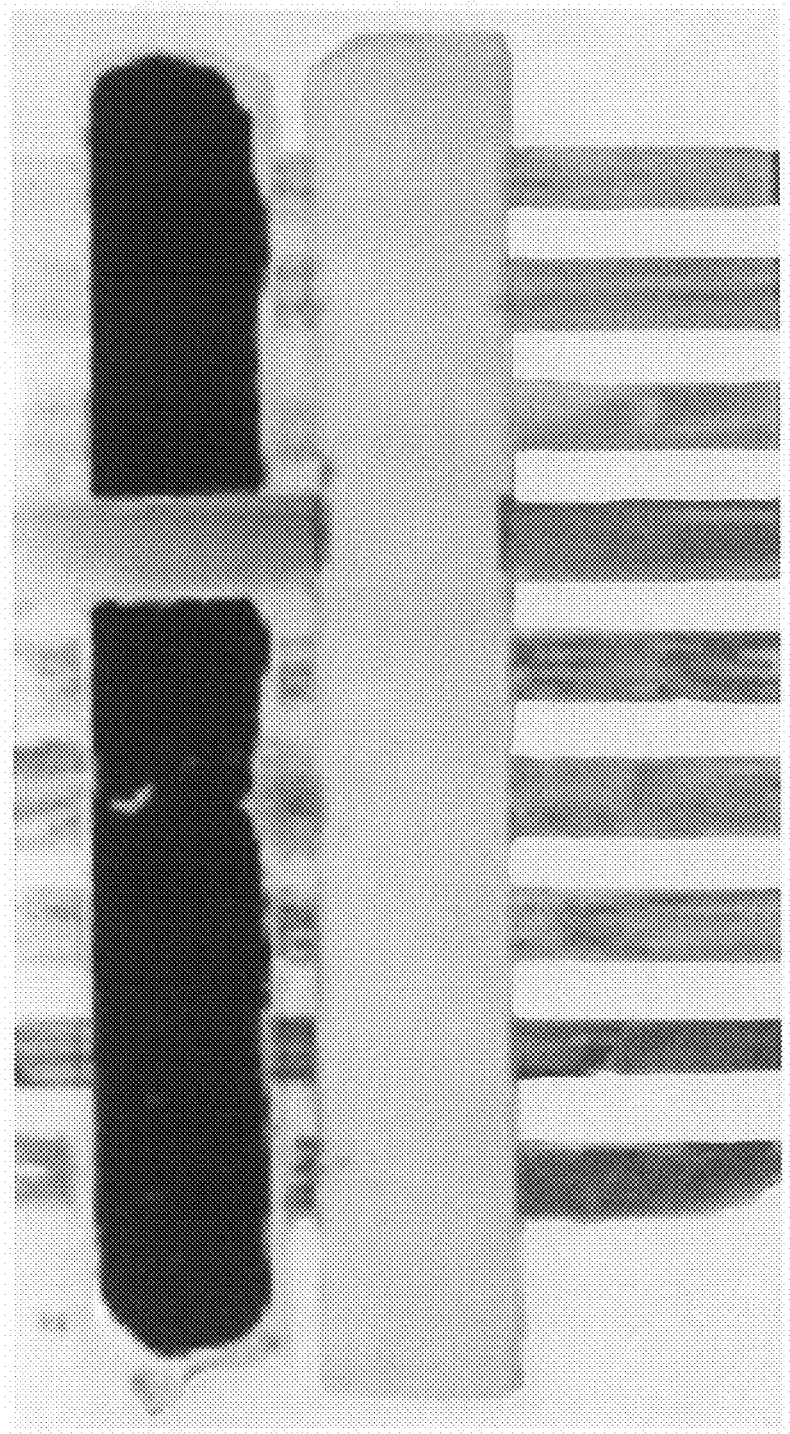
FIG. 1 is a photograph comparison of Goof-Off™ with Formulation R0765-35-18 on high gloss paint.

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, n-hexyl, and cyclohexyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, including but not limited to, phenoxy, phenyl, methylphenyl, dimethylphenyl, trimethylphenyl, chlorophenyl, trichloromethylphenyl, aminophenyl, and tristyrylphenyl.

As used herein, the term "alkylene" means a divalent saturated straight or branched chain hydrocarbon radical, such as for example, methylene, dimethylene, trimethylene.

As used herein, the terminology "($C_r$-$C_s$)" in reference to an organic group, wherein r and s are each integers, indicates that the group may contain from r carbon atoms to s carbon atoms per group.

As used herein, the terminology "surfactant" means a compound that when dissolved in an aqueous medium lowers the surface tension of the aqueous medium.

The present invention is a cleaning composition comprising a blend of dibasic esters. In one embodiment, the blend comprises adducts of alcohol and linear diacids, the adducts having the formula $R_1$—OOC-A-COO—$R_2$ wherein $R_1$ and/or $R_2$ comprise, individually, a $C_1$-$C_{12}$ alkyl, more typically a $C_1$-$C_8$ alkyl, and A comprises a mixture of —$(CH_2)_4$—, —$(CH_2)_3$—, and —$(CH_2)_2$—. In another embodiment, $R_1$ and/or $R_2$ comprise, individually, a $C_4$-$C_{12}$ alkyl, more typically a $C_4$-$C_8$ alkyl. In one embodiment, $R_1$ and $R_2$ can individually comprise a hydrocarbon group originating from fusel oil. In one embodiment, $R_1$ and $R_2$ individually can comprise a hydrocarbon group having 1 to 8 carbon atoms. In one embodiment, $R_1$ and $R_2$ individually can comprise a hydrocarbon group having 5 to 8 carbon atoms.

In one embodiment, the blend comprises adducts of alcohol and branched or linear diacids, the adducts having the formula R1-OOC-A-COO—R2 wherein R1 and/or R2 comprise, individually, a C1-C12 alkyl, more typically a C1-C8 alkyl, and A comprises a mixture of —(CH2)4-, —CH2CH2CH(CH3)-, and —CH2CH(C2H5)-. In another embodiment, R1 and/or R2 comprise, individually, a C4-C12 alkyl, more typically a C4-C8 alkyl. It is understood that the acid portion may be derived from such dibasic acids such as adipic, succinic, glutaric, oxalic, malonic, pimelic, suberic and azelaic acids, as well as mixtures thereof.

One or more dibasic esters used in the present invention can be prepared by any appropriate process. For example, a process for preparing the adduct of adipic acid and of fusel oil is, for example, described in the document "The Use of Egyptian Fusel Oil for the Preparation of Some Plasticizers Compatible with Polyvinyl Chloride", Chuiba et al., Indian Journal of Technology, Vol. 23, August 1985, pp. 309-311.

The dibasic esters of the present invention can be obtained by a process comprising an "esterification" stage by reaction of a diacid of formula HOOC-A-COOH or of a diester of formula MeOOC-A-COOMe with a branched alcohol or a mixture of alcohols. The reactions can be appropriately catalyzed. Use is preferably made of at least 2 molar equivalents of alcohols per diacid or diester. The reactions can, if appropriate, be promoted by extraction of the reaction by-products and followed by stages of filtration and/or of purification, for example by distillation.

The diacids in the form of mixtures can in particular be obtained from a mixture of dinitrile compounds in particular produced and recovered in the process for the manufacture of adiponitrile by double hydrocyanation of butadiene. This process, used on a large scale industrially to produce the greater majority of the adiponitrile consumed worldwide, is described in numerous patents and works. The reaction for the hydrocyanation of butadiene results predominantly in the formulation of linear dinitriles but also in formation of branched dinitriles, the two main ones of which are methylglutaronitrile and ethylsuccinonitrile. The branched dinitrile compounds are separated by distillation and recovered, for example, as top fraction in a distillation column, in the stages for separation and purification of the adiponitrile. The branched dinitriles can subsequently be converted to diacids or diesters (either to light diesters, for a subsequent transesterification reaction with the alcohol or the mixture of alcohols or the fusel oil, or directly to diesters in accordance with the invention).

Dibasic esters of the present invention may be derived from one or more by-products in the production of polyamide, for example, polyamide 6,6. In one embodiment, the cleaning composition comprises a blend of linear or branched, cyclic or noncyclic, $C_1$-$C_{20}$ alkyl, aryl, alkylaryl or arylalkyl esters of adipic diacids, glutaric diacids, and succinic diacids. In another embodiment, the cleaning composition comprises a blend of linear or branched, cyclic or noncyclic, $C_1$-$C_{20}$ alkyl, aryl, alkylaryl or arylalkyl esters of adipic diacids, methylglutaric diacids, and ethylsuccinic diacids Generally, polyamide is a copolymer prepared by a condensation reaction formed by reacting a diamine and a dicarboxylic acid. Specifically, polyamide 6,6 is a copolymer prepared by a condensation reaction formed by reacting a diamine, typically hexamethylenediamine, with a dicarboxylic acid, typically adipic acid.

In one embodiment, the blend of the present invention can be derived from one or more by-products in the reaction, synthesis and/or production of adipic acid utilized in the production of polyamide, the cleaning composition comprising a blend of dialkyl esters of adipic diacids, glutaric diacids, and succinic diacids (herein referred to sometimes as "AGS" or the "AGS blend").

In one embodiment, the blend of esters is derived from by-products in the reaction, synthesis and/or production of hexamethylenediamine utilized in the production of polyamide, typically polyamide 6,6. The cleaning composition comprises a blend of dialkyl esters of adipic diacids, methylglutaric diacids, and ethylsuccinic diacids (herein referred to sometimes as "MGA", "MGN", "MGN blend" or "MGA blend").

The boiling point of the dibasic ester blend of the present invention is between the range of about 120° C. to 450° C. In one embodiment, the boiling point of the blend of the present invention is in the range of about 160° C. to 400° C.; in one embodiment, the range is about 210° C. to 290° C.; in another embodiment, the range is about 210° C. to 245° C.; in another embodiment, the range is the range is about 215° C. to 225° C. In one embodiment, the boiling point range of the blend of the present invention is between about 210° C. to 390° C., more typically in the range of about 280° C. to 390° C., more typically in the range of 295° C. to 390° C. In one embodiment, boiling point of the blend of the present invention is in the range of about 215° C. to 400° C., typically in the range of about 220° C. to 350° C.

In one embodiment, the blend of dibasic esters has a boiling point range of between about 300° C. and 330° C. Typically, the diisoamyl AGS blend is associated with this boiling point range. In another embodiment, the dibasic ester blend of the present invention has a boiling point range of between about 295° C. and 310° C. Typically, the di-n-butyl AGS blend is associated with this boiling point range. Generally, a higher boiling point, typically, above 215° C., or high boiling point range corresponds to lower VOC.

The dibasic esters or blend of dibasic esters are incorporated into a cleaning composition of the present invention which, in one embodiment, comprises (a) a blend of dialkyl esters of adipic, glutaric, and succinic diacids or a blend of dialkyl esters of adipic, methylglutaric, and ethylsuccinic diacids; (b) at least one surfactant; and, optionally, (c) water or a solvent. Additional components may be added. The surfactant can be any number of cationic, amphoteric, zwitterionic, anionic or nonionic surfactants, derivatives thereof, as well as blends of such surfactants.

In one embodiment, the nonionic surfactants generally includes one or more of for example amides such as alkanolamides, ethoxylated alkanolamides, ethylene bisamides; esters such as fatty acid esters, glycerol esters, ethoxylated fatty acid esters, sorbitan esters, ethoxylated sorbitan; ethoxylates such as alkylphenol ethoxylates, alcohol ethoxylates, tristyrylphenol ethoxylates, mercaptan ethoxylates; end-capped and EO/PO block copolymers such as ethylene oxide/propylene oxide block copolymers, chlorine capped ethoxylates, tetra-functional block copolymers; amine oxides such lauramine oxide, cocamine oxide, stearamine oxide, stearamidopropylamine oxide, palmitamidopropylamine oxide, decylamine oxide; fatty alcohols such as decyl alcohol, lauryl alcohol, tridecyl alcohol, myristyl alcohol, cetyl alcohol, stearyl alcohol, oleyl alcohol, linoleyl alcohol and linolenyl alcohol; and alkoxylated alcohols such as ethoxylated lauryl alcohol, trideceth alcohols; and fatty acids such as lauric acid, oleic acid, stearic acid, myristic acid, cetearic acid, isostearic acid, linoleic acid, linolenic acid, ricinoleic acid, elaidic acid, arichidonic acid, myristoleic acid and mixtures thereof.

In another embodiment, the non-ionic surfactant is a glycol such as polyethylene glycol (PEG), alkyl PEG esters, polypropylene glycol (PPG) and derivatives thereof. In one embodiment, the surfactant is an alcohol ethoxylate, an alkyl phenol ethoxylate or a terpene alkoxylate. In one exemplary embodiment, the surfactant is a $C_6$-$C_{13}$ alcohol ethoxylate and, more typically, a $C_8$-$C_{12}$ alcohol ethoxylate.

In another embodiment, the surfactant is a cationic surfactant. The cationic surfactant includes but is not limited to quaternary ammonium compounds, such as cetyl trimethyl ammonium bromide (also known as CETAB or cetrimonium bromide), cetyl trimethyl ammonium chloride (also known as cetrimonium chloride), myristyl trimethyl ammonium bromide (also known as myrtrimonium bromide or Quaternium-13), stearyl dimethyl distearyldimonium chloride, dicetyl dimonium chloride, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, dicetyl dimonium chloride and distearyldimonium chloride; isostearylaminopropalkonium chloride or olealkonium chloride; behentrimonium chloride; as well as mixtures thereof.

In another embodiment, the surfactant is an anionic surfactant. The anionic surfactant includes but is not limited to linear alkylbenzene sulfonates, alpha olefin sulfonates, paraffin sulfonates, alkyl ester sulfonates, alkyl sulfates, alkyl alkoxy sulfates, alkyl sulfonates, alkyl alkoxy carboxylates, alkyl alkoxylated sulfates, monoalkyl phosphates, dialkyl phosphates, sarcosinates, sulfosuccinates, isethionates, and taurates, as well as mixtures thereof. Commonly used anionic surfactants that are suitable as the anionic surfactant component of the composition of the present invention include, for example, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium-monoalkyl phosphates, sodium dialkyl phosphates, sodium lauroyl sarcosinate, lauroyl sarcosine, cocoyl sarcosine, ammonium cocyl sulfate, ammonium lauryl sulfate, sodium cocyl sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, sodium lauryl sulfate, potassium cocyl sulfate, potassium lauryl sulfate, monoethanolamine cocyl sulfate, sodium tridecyl benzene sulfonate, and sodium dodecyl benzene sulfonate. Branched anionic surfactants are particularly preferred, such as sodium trideceth sulfate, sodium tridecyl sulfate, ammonium trideceth sulfate, ammonium tridecyl sulfate, and sodium trideceth carboxylate.

Any amphoteric surfactant that is acceptable for use includes but is not limited to derivatives of aliphatic secondary and tertiary amines in which the aliphatic radical can be straight chain or branched and wherein one of the aliphatic substituents contains from about 8 to about 18 carbon atoms and one contains an anionic water solubilizing group. Specific examples of suitable amphoteric surfactants include the alkali metal, alkaline earth metal, ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates, such as for example, cocoamphoacetate cocoamphopropionate, cocoamphodiacetate, lauroamphoacetate, lauroamphodiacetate, lauroamphodipropionate, lauroamphodiacetate, cocoamphopropyl sulfonate caproamphodiacetate, caproamphoacetate, caproamphodipropionate, and stearoamphoacetate.

Suitable zwitterionic surfactants include alkyl betaines, such as cocodimethyl carboxymethyl betaine, lauryl dimethyl carboxymethyl betaine, lauryl dimethyl alpha-carboxyethyl betaine, cetyl dimethyl carboxymethyl betaine, lauryl bis-(2-hydroxy-ethyl)carboxy methyl betaine, stearyl bis-(2-hydroxy-propyl)carboxymethyl betaine, oleyl dimethyl gamma-carboxypropyl betaine, and lauryl bis-(2-hydroxypropyl)alpha-carboxyethyl betaine, amidopropyl betaines, and alkyl sultaines, such as cocodimethyl sulfopropyl betaine, stearyldimethyl sulfopropyl betaine, lauryl dimethyl sulfoethyl betaine, lauryl bis-(2-hydroxy-ethyl)sulfopropyl betaine, and alkylamidopropylhydroxy sultaines.

In one embodiment, the cleaning composition is a microemulsion comprising (a) a blend of about 70-90% dialkyl dimethylglutarate, about 5-30% dialkyl ethylsuccinate and about 0-10% dialkyl adipate; (b) a surfactant composition comprising i) an alcohol alkoxylate, a terpene alkoxylate, or derivatives thereof; (c) a delaminate and (d) water. Each alkyl substituent individually chosen from a hydrocarbon group containing from about 1 to 8 hydrocarbons such as methyl or ethyl, propyl, isopropyl, butyl, n-butyl or pentyl, or iso-amyl groups. Optionally, one or more additives or additional components such as delaminating agents, buffering and/or pH control agents, fragrances, opacifying agents, anti-corrosion agents, whiteners, defoamers, dyes, sudsing control agents, stabilizers, thickeners and the like can be added to the composition.

According to one embodiment of the present invention, the blend of dibasic esters corresponds to one or more by-products of the preparation of adipic acid, which is one of the main monomers in polyamides. For example, the dialkyl esters are obtained by esterification of one by-product, which generally contains, on a weight basis, from 15 to 33% succinic acid, from 50 to 75% glutaric acid and from 5 to 30% adipic acid. As another example, the dialkyl esters are obtained by esterification of a second by-product, which generally contains, on a weight basis, from 30 to 95% methyl glutaric acid, from 5 to 20% ethyl succinic acid and from 1 to 10% adipic acid. It is understood that the acid portion may be derived from such dibasic acids such as, adipic, succinic, glutaric, oxalic, malonic, pimelic, suberic and azelaic acids, as well as mixtures thereof.

In some embodiments, the dibasic ester blend comprises adducts of alcohol and linear diacids, the adducts having the formula R—OOC-A-COO—R wherein R is ethyl and A is a mixture of —(CH$_2$)$_4$—, —(CH$_2$)$_3$—, and —(CH$_2$)$_2$—. In other embodiments, the blend comprises adducts of alcohol, typically ethanol, and linear diacids, the adducts having the formula R$^1$—OOC-A-COO—R$^2$, wherein at least part of R$^1$ and/or R$^2$ are residues of at least one linear alcohol having 4 carbon atoms, and/or at least one linear or branched alcohol having at least 5 carbon atoms, and wherein A is a divalent linear hydrocarbon. In some embodiments A is one or a mixture of —(CH$_2$)$_4$—, —(CH$_2$)$_3$—, and —(CH$_2$)$_2$—.

In another embodiment, the R$^1$ and/or R$^2$ groups can be linear or branched, cyclic or noncyclic, C$_1$-C$_{20}$ alkyl, aryl, alkylaryl or arylalkyl groups. Typically, the R$^1$ and/or R$^2$ groups can be C$_1$-C$_8$ groups, for example groups chosen from the methyl, ethyl, n-propyl, isopropyl, n-butyl, n-amyl, n-hexyl, cyclohexyl, 2-ethylhexyl and isooctyl groups and their mixtures. For example, R$^1$ and/or R$^2$ can both or individually be ethyl groups, R$^1$ and/or R$^2$ can both or individually be n-propyl groups, R$^1$ and/or R$^2$ can both or individually be isopropyl groups, R$^1$ and/or R$^2$ can both or individually be n-butyl groups, R$^1$ and/or R$^2$ can both or individually be iso-amyl groups, R$^1$ and/or R$^2$ can both or individually be n-amyl groups, or R$^1$ and/or R$^2$ can be mixtures thereof (e.g., when comprising a blend of dibasic esters).

In further embodiments the invention can include blends comprising adducts of branched diacids, the adducts having the formula R$^3$—OOC-A-COO—R$^4$ wherein R$^3$ and R$^4$ are the same or different alkyl groups and A is a branched or linear hydrocarbon. Typically, A comprises an isomer of a C$_4$ hydrocarbon. Examples include those where R$^3$ and/or R$^4$ can be linear or branched, cyclic or noncyclic, C$_1$-C$_{20}$ alkyl, aryl, alkylaryl or arylalkyl groups. Typically, R$^3$ and R$^4$ are independently selected from the group consisting of methyl, ethyl, propyl, isopropyl, butyl, n-butyl, iso-butyl, iso-amyl, and fusel.

In yet another embodiment, the invention comprises a composition based on dicarboxylic acid diester(s) of formula R$^5$—OOC-A-COO—R$^6$ wherein group A represents a divalent alkylene group typically in the range of, on average, from 2.5 to 10 carbon atoms. R$^5$ and R$^6$ groups, which can be identical or different, represent a linear or branched, cyclic or noncyclic, C$_1$-C$_{20}$ alkyl, aryl, alkylaryl or an arylalkyl group.

The blend can correspond to a complex reaction product, where mixtures of reactants are used. For example, the reaction of a mixture of HOOC-A$^a$-COOH and HOOC-A$^b$-COOH with an alcohol R$^a$—OH can give a mixture of the products R$^a$OOC-A$^a$-COOR$^a$ and R$^a$OOC-A$^b$-COOR$^a$. Likewise, the reaction of HOOC-A$^a$-COOH with a mixture of alcohols R$^a$—OH and R$^b$—OH can give a mixture of the products R$^a$OOC-A$^a$-COOR$^a$ and R$^b$OOC-A$^a$-COOR$^b$, R$^a$OOC-A$^a$-COOR$^b$ and R$^b$OOC-A$^a$-COOR$^a$ (different from R$^a$OOC-A$^a$-COOR$^b$ if A$^a$ is not symmetrical). Likewise, the reaction of a mixture of HOOC-A$^a$-COOH and HOOC-A$^b$-COOH with a mixture of alcohols R$^a$—OH and R$^b$—OH can give a mixture of the products R$^a$OOC-A$^a$-COOR$^a$ and R$^b$OOC-A$^a$-COOR$^b$, R$^a$OOC-A$^a$-COOR$^b$, R$^b$OOC-A$^a$-COOR$^a$ (different from R$^a$OOC-A$^a$-COOR$^b$ if A$^a$ is not symmetrical), R$^a$OOC-A$^b$-COOR$^a$ and R$^b$OOC-A$^b$-COOR$^b$, R$^a$OOC-A$^b$-COOR$^b$ and R$^b$OOC-A$^b$-COOR$^a$ (different from R$^a$OOC-A$^b$-COOR$^b$ if A$^b$ is not symmetrical).

The groups R$^1$ and R$^2$, can correspond to alcohols R$^1$—OH and R$^2$—OH (respectively). These groups can be likened to the alcohols. The group(s) A, can correspond to one or more dicarboxylic acid(s) HOOC-A-COOH. The group(s) A can be likened to the corresponding diacid(s) (the diacid comprises 2 more carbon atoms than the group A).

In one embodiment, group A is a divalent alkylene group comprising, on average, more than 2 carbon atoms. It can be a single group, with an integral number of carbon atoms of greater than or equal to 3, for example equal to 3 or 4. Such a single group can correspond to the use of a single acid. Typically, however, it corresponds to a mixture of groups corresponding to a mixture of compounds, at least one of which exhibits at least 3 carbon atoms. It is understood that the mixtures of groups A can correspond to mixtures of different isomeric groups comprising an identical number of carbon atoms and/or of different groups comprising different numbers of carbon atoms. The group A can comprise linear and/or branched groups.

According to one embodiment, at least a portion of the groups A corresponds to a group of formula —(CH$_2$)$_n$— where n is a mean number greater than or equal to 3. At least a portion of the groups A can be groups of formula —(CH$_2$)$_4$— (the corresponding acid is adipic acid). For example, A can be a group of formula —(CH$_2$)$_4$—, and/or a group of formula —(CH$_2$)$_3$—.

In one embodiment, the composition comprises compounds of formula R—OOC-A-COO—R where A is a group of formula —(CH$_2$)$_4$—, compounds of formula R—OOC-A-COO—R where A is a group of formula —(CH$_2$)$_3$—, and compounds of formula R—OOC-A-COO—R where A is a group of formula —(CH$_2$)$_2$—.

The blend of dibasic esters is typically present in the cleaning composition in microemulsion form (liquid droplets dispersed in the aqueous phase). Without wishing to be bound to any theory, it is pointed out that microemulsions are generally thermodynamically stable systems generally comprising large amounts of emulsifiers. The other emulsions (macroemulsions) are generally systems in thermodynamically unstable state, conserving for a certain time, in metastable state, the mechanical energy supplied during the emulsification. These systems generally comprise smaller amounts of emulsifiers.

In one embodiment, the microemulsion of the present invention is an emulsion whose mean droplet size is generally less than or equal to about 0.15 μm. The size of the microemulsion droplets may be measured by dynamic light scattering (DLS), for example as described below. The apparatus used consists, for example, of a Spectra-Physics 2020 laser, a Brookhaven 2030 correlator and the associated computer-based equipment. If the sample is concentrated, it may be diluted in deionized water and filtered through a 0.22 μm filter to have a final concentration of 2% by weight. The diameter obtained is an apparent diameter. The measurements are taken at angles of 90° and 135°. For the size measurements, besides the standard analysis with cumulents, three exploitations of the autocorrelation function are used (exponential sampling or EXPSAM described by Prof. Pike, the "Non Negatively Constrained Least Squares" or NNLS method, and the CONTIN method described by Prof Provencher), which each give a size distribution weighted by the scattered intensity, rather than by the mass or the number. The refractive index and the viscosity of the water are taken into account.

According to one embodiment, the microemulsion is transparent. The microemulsion may have, for example, a transmittance of at least 90% and preferably of at least 95% at a wavelength of 600 nm, for example measured using a Lambda 40 UV-visible spectrometer.

According to another embodiment, the emulsion is an emulsion whose mean droplet size is greater than or equal to 0.15 μm, for example greater than 0.5 μm, or 1 μm, or 2 μm, or 10 μm, or 20 μm, and preferably less than 100 μm. The droplet size may be measured by optical microscopy and/or laser granulometry (Horiba LA-910 laser scattering analyzer).

In certain embodiments, the dibasic ester blend comprises:
a diester of formula I:

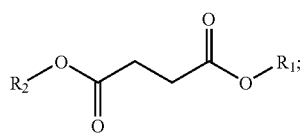

(I)

a diester of formula II:

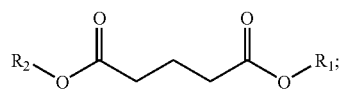

(II)

and
a diester of formula III:

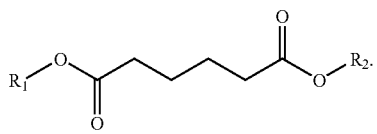

(III)

R$_1$ and/or R$_2$ can individually comprise a hydrocarbon having from about 1 to about 8 carbon atoms, typically, methyl, ethyl, propyl, isopropyl, butyl, isobutyl, n-butyl, isoamyl, hexyl, heptyl or octyl. In such embodiments, the blend typically comprises (by weight of the blend) (i) about 15% to about 35% of the diester of formula I, (ii) about 55% to about 70% of the diester of formula II, and (iii) about 7% to about 20% of the diester of formula III, and more typically, (i) about 20% to about 28% of the diester of formula I, (ii) about 59% to about 67% of the diester of formula II, and (iii) about 9% to about 17% of the diester of formula III. The blend is generally characterized by a flash point of 98° C., a vapor pressure at 20° C. of less than about 10 Pa, and a distillation temperature range of about 200-300° C. Mention may also be made of Rhodiasolv® RPDE (Rhodia Inc., Cranbury, N.J.), Rhodiasolv® DIB (Rhodia Inc., Cranbury, N.J.) and Rhodiasolv® DEE (Rhodia Inc., Cranbury, N.J.).

In certain other embodiments, the dibasic ester blend comprises:
a diester of the formula IV:

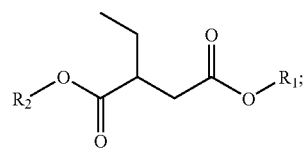

(IV)

a diester of the formula V:

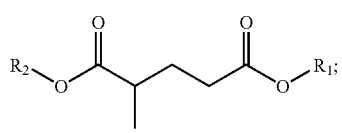

(V)

a diester of the formula VI:

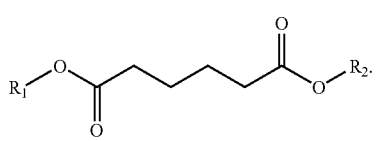

(VI)

R$_1$ and/or R$_2$ can individually comprise a hydrocarbon having from about 1 to about 8 carbon atoms, typically, methyl, ethyl, propyl, isopropyl, butyl, isobutyl, n-butyl, isoamyl, hexyl, heptyl, or octyl. In such embodiments, the blend typically comprises (by weight of the blend) (i) from about 5% to about 30% of the diester of formula IV, (ii) from about 70% to about 95% of the diester of formula V, and (iii) from about 0% to about 10% of the diester of formula VI. More typically, the blend typically comprises (by weight of the blend): (i) from about 6% to about 12% of the diester of formula IV, (ii) from about 86% to about 92% of the diester of formula V, and (iii) from about 0.5% to about 4% of the diester of formula VI.

Most typically, the blend comprises (by weight of the blend): (i) about 9% of the diester of formula IV, (ii) about 89% of the diester of formula V, and (iii) about 1% of the diester of formula VI. The blend is generally characterized by a flash point of of 98° C., a vapor pressure at 20° C. of less than about 10 Pa, and a distillation temperature range of about 200-275° C. Mention may be made of Rhodiasolv® IRIS and Rhodiasolv® DEE/M, manufactured by Rhodia Inc. (manufactured by Rhodia Inc., Cranbury, N.J.)

In one embodiment, water can include but is not limited to tap water, filtered water, bottled water, spring water, distilled water, deionized water, and/or industrial soft water.

In another embodiment, the solvent can include organic solvents, including but not limited to aliphatic or acyclic hydrocarbons solvents, halogenated solvents, aromatic hydrocarbon solvents, glycol ether, a cyclic terpene, unsaturated hydrocarbon solvents, halocarbon solvents, polyols, ethers, esters of a glycol ether, alcohols including short chain alcohols, ketones or mixtures thereof.

In one embodiment, additional surfactants may be utilized in the present invention. Surfactants that are useful for preparing the microemulsion of the present invention can be one or more anionic surfactants, cationic surfactants, non-ionic surfactants, zwitterionic surfactants, amphoteric surfactants.

Typically nonionic surfactants are utilized, which include but are not limited to polyalkoxylated surfactants, for example chosen from alkoxylated alcohols, alkoxylated fatty alcohols, alkoxylated triglycerides, alkoxylated fatty acids, alkoxylated sorbitan esters, alkoxylated fatty amines, alkoxylated bis(1-phenylethyl)phenols, alkoxylated tris(1-phenylethyl)phenols and alkoxylated alkylphenols, in which the number of alkoxy and more particularly oxyethylene and/or oxypropylene units is such that the HLB value is greater than or equal to 10. More typically, the nonionic surfactant can be selected from the group consisting of ethylene oxide/propylene oxide copolymers, terpene alkoxylates, alcohol ethoxylates, alkyl phenol ethoxylates and combinations thereof.

In one embodiment, the alcohol ethoxylates used in connection with the present invention have the formula:

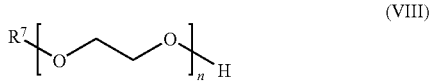

(VIII)

Typically, $R^7$ is a hydrogen or a hydrocarbon chain containing about 5 to about 25 carbon atoms, more typically from about 7 to about 14 carbon atoms, most typically, from about 8 to about 13 carbon atoms, and may be branched or straight-chained and saturated or unsaturated and is selected from the group consisting of hydrogen, alkyl, alkoxy, aryl, alkaryl, alkylarylalkyl and arylalkyl. Typically, "n" is an integer from about 1 to about 30, more typically an integer from 2 to about 20, and most typically an integer from about 3 to about 12.

In an alternative embodiment, the alcohol ethoxylate is sold under the trade name Rhodasurf 91-6 (manufactured by Rhodia Inc., Cranbury, N.J.).

In yet another embodiment, surfactants used in the present invention are non-ionic surfactants including but not limited to: polyoxyalkylenated $C_6$-$C_{24}$ aliphatic alcohols comprising from 2 to 50 oxyalkylene (oxyethylene and/or oxypropylene) units, in particular of those with 12 (mean) carbon atoms or with 18 (mean) carbon atoms; mention may be made of Antarox B12DF, Antarox FM33, Antarox FM63 and Antarox V74, Rhodasurf ID 060, Rhodasurf ID 070 and Rhodasurf LA 42 from (Rhodia Inc., Cranbury, N.J.), as well as polyoxyalkylenated $C_8$-$C_{22}$ aliphatic alcohols containing from 1 to 25 oxyalkylene (oxyethylene or oxypropylene) units.

In a further embodiment, the surfactant comprises a terpene or a terpene alkoxylate. Terpene alkoxylates are terpene-based surfactants derived from a renewable raw materials such as α-pinene and β-pinene, and have a C-9 bicyclic alkyl hydrophobe and polyoxy alkylene units in an block distribution or intermixed in random or tapered distribution along the hydrophilic chain. The terpene alkoxylate surfactants are described in the U.S. Patent Application Publication No. 2006/0135683 to Adam al., Jun. 22, 2006, is incorporated herein by reference.

Typical terpene alkoxylates are Nopol alkoxylate surfactants and have the general formula:

(IX)

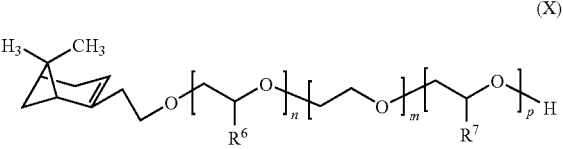

(X)

where $R^6$ and $R^7$ are, individually, hydrogen, $CH_3$, or $C_2H_5$; "n" is from about 1 to about 30; "m" is from about 0 to about 20; and "p" is from about 0 to 20. The "n", "m" and/or "p" units may be of block distribution or intermixed in random or tapered distribution along the chain.

In another embodiment, $R^6$ is $CH_3$; "n" is from about 20 to about 25; "m" is from about 5 to about 10. In yet another embodiment, $R^6$ and $R^7$ are individually $CH_3$; "n" is from about 1 to about 8; "m" is from about 2 to about 14; and "p" is from about 10 to about 20. Mention can be made of Rhodoclean® HP (a terpene EO/PO) (manufactured by Rhodia Inc., Cranbury, N.J.) and Rhodoclean® MSC (a terpene EO/PO) (manufactured by Rhodia Inc., Cranbury, N.J.).

In a further or alternative embodiment, additional components or additives may be added to the cleaning composition of the present invention. The additional components include, but are not limited to, delaminates, buffering and/or pH control agents, fragrances, perfumes, defoamers, dyes, whiteners, brighteners, solubilizing materials, stabilizers, thickeners, corrosion inhibitors, lotions and/or mineral oils, enzymes, cloud point modifiers, preservatives, ion exchangers, chelating agents, sudsing control agents, soil removal agents, softening agents, opacifiers, inert diluents, graying inhibitors, stabilizers, polymers and the like.

Typically, additional components comprise one or more delaminates. Delaminates can be certain terpene-based derivatives that can include, but are not limited to, pinene and pinene derivatives, d-limonene, dipentene and oc-pinene.

The buffering and pH control agents include for example, organic acids, mineral acids, as well as alkali metal and alkaline earth salts of silicate, metasilicate, polysilicate, borate, carbonate, carbamate, phosphate, polyphosphate, pyrophosphates, triphosphates, ammonia, hydroxide, monoethanolamine, monopropanolamine, diethanolamine, dipropanolamine, triethanolamine, and/or 2-amino-2methylpropanol.

More specifically, the buffering agent can be a detergent or a low molecular weight, organic or inorganic material used for maintaining the desired pH. The buffer can be alkaline, acidic or neutral, including but not limited to 2-amino-2-methyl-propanol; 2-amino-2-methyl-1,3-propanol; disodium glutamate; methyl diethanolarnide; N,N-bis(2-hydroxyethyl) glycine; tris(hydroxymethyl)methyl glycine; ammonium carbamate; citric acid; acetic acid; ammonia; alkali metal carbonates; and/or alkali metal phosphates.

In still another embodiment, thickeners, when used, include, but are not limited to, cassia gum, tam gum, xanthan gum, locust beam gum, carrageenan gum, gum karaya, gum arabic, hyaluronic acids, succinoglycan, pectin, crystalline polysaccharides, branched polysaccharide, calcium carbonate, aluminum oxide, alginates, guar gum, hydroxypropyl guar gum, carboxymethyl guar gum, carboxymethylhydroxypropyl guar gum, and other modified guar gums, hydroxycelluloses, hydroxyalkyl cellulose, including hydroxyethyl cellulose, carboxymethylhydroxyethyl cellulose, hydroxypropyl cellulose, carboxymethylcellulose and/or other modified celluloses. In a further embodiment, the whiteners include, but are not limited to, percarbonates, peracids, perborates, chlorine-generating substances hydrogen peroxide, and/or hydrogen peroxide-based compounds. In another embodiment, the polymer is generally a water soluble or dispersable polymer having a weight average molecular weight of generally below 2,000,000.

Since dibasic esters are subject to hydrolysis under certain conditions, it is understood that the blend of dibasic esters can contain a minute amount of alcohol, typically a low molecular weight alcohol such as ethanol, in concentrations of about 2% to about 0.2%.

A generally contemplated composition of the present invention, in one embodiment, comprises (based on the total weight of the composition) (a) from about 1% to about 60% by weight a blend of dibasic esters and (b) from about 1% to about 65% by weight one or more surfactants. The composition may optionally contain water or a solvent in varying amounts, depending on the desired concentration. For example, it may be desirable to have the composition of the present invention as a concentrated composition for shipping, transportation purposes as well as for other cost savings. It may also be desirable to have the present invention in fully diluted form.

In either concentrated or diluted form, the composition of the present invention is hydrolytically stable, typically up to 6 months or greater, more typically up to 12 months or greater for the diluted form and longer in the concentrated form. The formulations of the present invention, which contain the dibasic ester blends, typically, MGN blends, have hydrolysis stability, where hydrolysis/decomposition typically produces the acid form of the ester and methanol. The methanol concentration of the formulation comprising the described dibasic ester blend was monitored and shown to generally be stable, typically less than 300 ppm (parts per million), more typically less than or about 250 ppm, typically at or less than about 210 ppm. (When prior art ester-based cleaning solutions sit in an aqueous solution, the esters typically begin to decompose. The decomposing ester produces undesirable and potentially hazardous byproducts. Furthermore, as the ester decomposes, the amount of ester, which is the active ingredient in the cleaning solution, is decreasing.)

In another embodiment, the cleaning composition further comprises about 1% to about 12% by weight d-limonene. The cleaning composition of the present invention can be used in a variety of consumer and/or industrial applications.

In another aspect, the present invention is a cleaning composition comprising: from about 1% to about 60% by weight a blend of dibasic esters; from about 0.1% to about 50% by weight one or more surfactants; and, optionally, water; more typically, from about 5% to about 40% by weight a blend of dibasic esters; (b) from about 5% to about 40% by weight one or more surfactants, typically, one or more nonionic surfactants; and, optionally, (c) water. In another embodiment, the cleaning composition further comprises about 1% to about 12% by weight a pinene or derivative thereof, typically, d-limonene. Optionally, additives such as fragrances and solubilizers, pH adjusting agents, whiteners, delaminates, opacifying agent, anti-corrosion agents, anti-foaming agents, coloring agents, stabilizers and thickeners can be added. The cleaning composition of the present invention is typically in form of a microemulsion and provided as a liquid or spray formulation for use, depending upon the application. The cleaning composition of the present invention is typically in form of a microemulsion. The cleaning composition can also be provided as a liquid or spray formulation for use, depending upon the application.

The present invention in one embodiment, is a method for removing stains (including but limited to pencil, crayon, highlighter, ketchup, permanent marker, mustard, ink, washable marker, lipstick, and hydrophobic stains in general), ink (typically, printing ink), organic stains on clothes, resin, tar-resin, graffiti, stains on painted surfaces or plastic or metal substrates, from skin or hair, paint from a surface, or as a degreasing composition, comprising obtaining the cleaning composition of the present invention, contacting the cleaning composition with a surface having any of the above-referenced stain on it, and removing the used cleaning composition from the cleaned surface.

In one embodiment, the cleaning composition of the present invention can be particularly used in the removal of ink used for cleaning printing presses, blankets, rollers and the like. It is understood that the cleaning composition of the present invention can clean a variety of inks, for example, oil-based inks, UV inks, as well as waterbased inks, among others. The ink cleaning relates to printing ink cleaning primarily for offset/lithographic, flexographic, gravure, screen and ink jet ink cleaning. The cleaning composition of present invention can be in concentrated form or non-concentrated form, and is hydrolytically stable in both forms. In one embodiment, the present invention is a cleaning composition for cleaning inks from rollers etc. comprising (based on the total weight of the composition) (a) from about 1% to about 60% by weight, more typically from about 1% to about 35%, of a blend of dibasic esters as described herein, typically an MGN blend of dibasic esters; (b) from about 1% to about 60% by weight, typically from about 1% to about 35%, one or more surfactants or blend of surfactants—typically the surfactant is a nonionic surfactant, more typically an alcohol ethoxylate. The ink cleaning composition may optionally contain, based upon total weight of the composition, from about 0.1% to about 12% of a terpene, terpene EO/PO, pinene or derivative thereof, typically a terpene EO/PO. The composition may optionally contain water, typically from about 1% to about 85% by weight of the composition, or a solvent in varying amounts, depending on the desired concentration. Methods for cleaning an ink-stained surface, such as those of printing presses, blankets, rollers and the like are also contemplated, which includes obtaining or preparing the ink cleaning composition, contacting the cleaning composition onto a surface or material to be cleaned, and, optionally, removing the used cleaning composition from the surface or material.

In one embodiment, the present invention is a cleaning composition for cleaning stained surfaces, typically painted surfaces. The stains include but are not limited to pencil, crayon, highlighter, ketchup, permanent marker, mustard, ink, washable marker, lipstick, and hydrophobic stains in general. The cleaning composition for cleaning stained surfaces, typically painted surfaces comprising (based on the total weight of the composition) (a) from about 1% to about 60% by weight, more typically from about 1% to about 35%, of a blend of dibasic esters, typically an MGN blend of dibasic esters; (b) from about 1% to about 60% by weight, typically from about 1% to about 35% by weight, more typically from about 1% to about 25% by weight a surfactant or blend of surfactants. The surfactant is typically a non-ionic surfactant, more typically an alcohol ethoxylate, even more typically a $C_8$-$C_{12}$ alcohol ethoxylate. The stained painted surface cleaning composition may optionally contain, based upon total weight of the composition, from about 0.1% to about 12% of a delaminate, typically, terpene, terpene EO/PO, pinene or derivative thereof, even more typically, d-limonene. The composition may optionally contain water, typically from about 1% to about 85% by weight of the composition, or a solvent in varying amounts, depending on the desired concentration. Methods for cleaning a stained painted surface, more typically surfaces which are coated with latex paint, etc., are also contemplated, which includes obtaining or preparing the cleaning composition for painted surfaces, contacting the cleaning composition onto a surface or material to be cleaned, and, optionally, removing the used cleaning composition from the surface or material.

In one embodiment, the composition of the present invention can be used to remove graffiti and other stains from plastic substrates, as well as coated or non-porous surfaces, such as, for example, baked or high gloss enamel or polished surfaces, masonry, namely, cement and concrete, brick, tile and the like, stone and polished stone, metals including but not limited to aluminum, copper, bronze and steel, and wood. The plastic substrate cleaning composition comprises (based on the total weight of the composition) (a) from about 1% to about 60% by weight, more typically from about 1% to about 35%, of a blend of dibasic esters, typically an MGN blend of dibasic esters; (b) from about 1% to about 60% by weight, typically from about 1% to about 35% by weight, more typically from about 1% to about 25% by weight a surfactant or blend of surfactants. The surfactant is typically a non-ionic surfactant, more typically an alcohol ethoxylate, even more typically a $C_8$-$C_{12}$ alcohol ethoxylate. The plastic substrate cleaning composition may optionally contain, based upon total weight of the composition, from about 0.1% to about 12% of a delaminate, typically, terpene, terpene EO/PO, pinene or derivative thereof, even more typically, d-limonene. The composition may optionally contain water, typically from about 1% to about 85% by weight of the composition, or a solvent in varying amounts, depending on the desired concentration. Methods for cleaning an plastic substrate are also contemplated, which includes obtaining or preparing the plastic substrate cleaning composition, contacting the cleaning composition onto a surface or material to be cleaned, and, optionally, removing the used cleaning composition from the surface or material.

In one embodiment, the composition of the present invention can be used to remove or aid the removal of stains from textiles, for example as a spot-stain cleaner. The textile cleaning composition in this embodiment comprises (based on the total weight of the composition) (a) from about 1% to about 60% by weight, typically from about 1% to about 45%, more typically from about 1% to about 35%, of a blend of dibasic esters, typically an MGN blend of dibasic esters; (b) from about 1% to about 60% by weight, typically from about 1% to about 35% by weight, more typically from about 1% to about 25% by weight a surfactant or blend of surfactants. The surfactant is typically a non-ionic surfactant, more typically an alcohol ethoxylate, even more typically a $C_8$-$C_{12}$ alcohol ethoxylate. The textile cleaning composition may optionally contain, based upon total weight of the composition, from about 0.1% to about 12% of a terpene, terpene EO/PO, pinene or derivative thereof, typically, terpene EO/PO. The composition may optionally contain water, typically from about 1% to about 85% by weight of the composition, or a solvent in varying amounts, depending on the desired concentration. Methods for cleaning a textile are also contemplated, which includes obtaining or preparing the textile cleaning composition, contacting the cleaning composition onto a surface or material to be cleaned, and, optionally, removing the used cleaning composition from the surface or material.

EXPERIMENTS

Painted Substrate Cleaning Examples

Experimental work leading to a particular embodiment of the present invention are described in the following Tables 1-4 which correspond to FIGS. 1-4, respectively. Commercially available Sherwin-Williams™ all-acrylic waterborne paint (both High & low gloss) was applied on lanetta chart using 7 mils wet draw-down bar. The coatings were allowed to dry for minimum 72 hours before applying stains. Various stains such as pencil, crayon, highlighter, ketchup, permanent marker, mustard, ink pen, washable marker, lipstick were applied on painted lanetta chart. These stains were allowed to dry for minimum 24 hours.

The panels were then placed on a Gardco® scrubber. Principles of ASTM #D 2486-06 (Standard test methods for scrub resistance of house paint) test method were followed to conduct the experiments. These test method were developed in particular to clean stains from painted panels. A special assembly, specifically designed to perform a rubbing action on a designated surface, was attached to the Gardco® scrubber. The special assembly comprised essentially of a device secured to a paint brush at one end, wherein a cotton pad was secured on paint brush on its other end with tape. One milliliter prepared formulation was applied to the cotton pad. The special assembly attached to the Gardco® scrubber then completed 20 rubs on the prepared panel. This operation was repeated two more times. After completing 60 cycles with 3 ml formulation and final 20 cycles were repeated without any formulations or solutions. This cleaning process was completed for each of the examples listed below. The panels utilizing the stains details above were continually monitored.

| Legend | |
|---|---|
| Cleaning Efficiency | Description |
| 0 | No cleaning, i.e., no observable change in the stain or observable adverse effect in cleaning |

-continued

| Cleaning Efficiency | Description |
|---|---|
| 1 | Slight cleaning, i.e., slight observable change in stain |
| 2 | Moderate cleaning, i.e., some beneficial change in stain although stain still readily observable |
| 3 | High cleaning, i.e., substantial beneficial change in stain but some portions of stain still observable |
| 4 | Excellent cleaning, i.e., no observable portion of stain present |

Example 1

TABLE 1(a)

Formulation R0765-35-18:

| R0765-35-18 | Amount used (grams) |
|---|---|
| Rhodiasolv ® Iris | 28.73 gms |
| d-limonene | 7.73 gms |
| $C_8$-$C_{13}$ alcohol ethoxylate | 34.73 gms |
| water | 28.81 gms |
| | 100.00 gms |

TABLE 1(b)

Comparison between R0765-35-18 and Goof Off ®
Comparison of Goof-Off ® with Formulation
R0765-35-18 on High Gloss paint

| Stain type | Cleaning Efficiency of Goof-Off ® | Cleaning Efficiency of Formulation R0765-35-18 |
|---|---|---|
| Pencil | 0 | 4 |
| Crayon | 0 | 4 |
| Highlighter | 0 | 4 |
| Ketchup | 1 | 4 |
| Permanent Marker | 0 | 3 |
| Mustard | 0 | 4 |
| Ink | 0 | 3 |
| Washable Marker | 0 | 4 |
| Lipstick | 0 | 4 |

Table 1(b) corresponds to FIG. 1. Goof-Off® is believed to contain a composition of about, by weight of the total composition, 30-35% diethylene glycol monomethyl ether, 25-30% xylene isomers (c-, o-, p-) and 5-10% ethyl benzene. It was observed that Formulation R0765-35-18 removed the described stains, except with respect to the permanent marker and ink, such that no observable stain was present after the cleaning process. In the two exceptions, only a slight part of the stain was still observable. The Goof-Off® composition did not remove any of the stains more so relative to Formulation R0765-35-18.

Example 2

TABLE 2(a)

Formulation:

| R0765-41-16 | Amount used (grains) |
|---|---|
| Rhodiasolv ® Iris | 10.38 gms |
| d-limonene | 10.37 gms |
| $C_8$-$C_{13}$ alcohol ethoxylate | 21.01 gms |
| Water | 58.24 gms |
| | 100.00 gms |

TABLE 2(b)

Comparison between R0765-41-16 and Goof-Off ®
Comparison of Goof-Off ® with Formulation
R0765-41-16 on Low Gloss paint

| Stain type | Cleaning Efficiency of Goof-Off ® | Cleaning Efficiency of Formulation R0765-41-16 |
|---|---|---|
| Pencil | 0 | 4 |
| Crayon | 0 | 4 |
| Highlighter | 0 | 3 |
| Ketchup | 0 | 4 |
| Permanent Marker | 0 | 3 |
| Mustard | 0 | 3 |
| Ink | 0 | 3 |
| Washable Marker | 0 | 2 |
| Lipstick | 0 | 4 |

Figure 2:
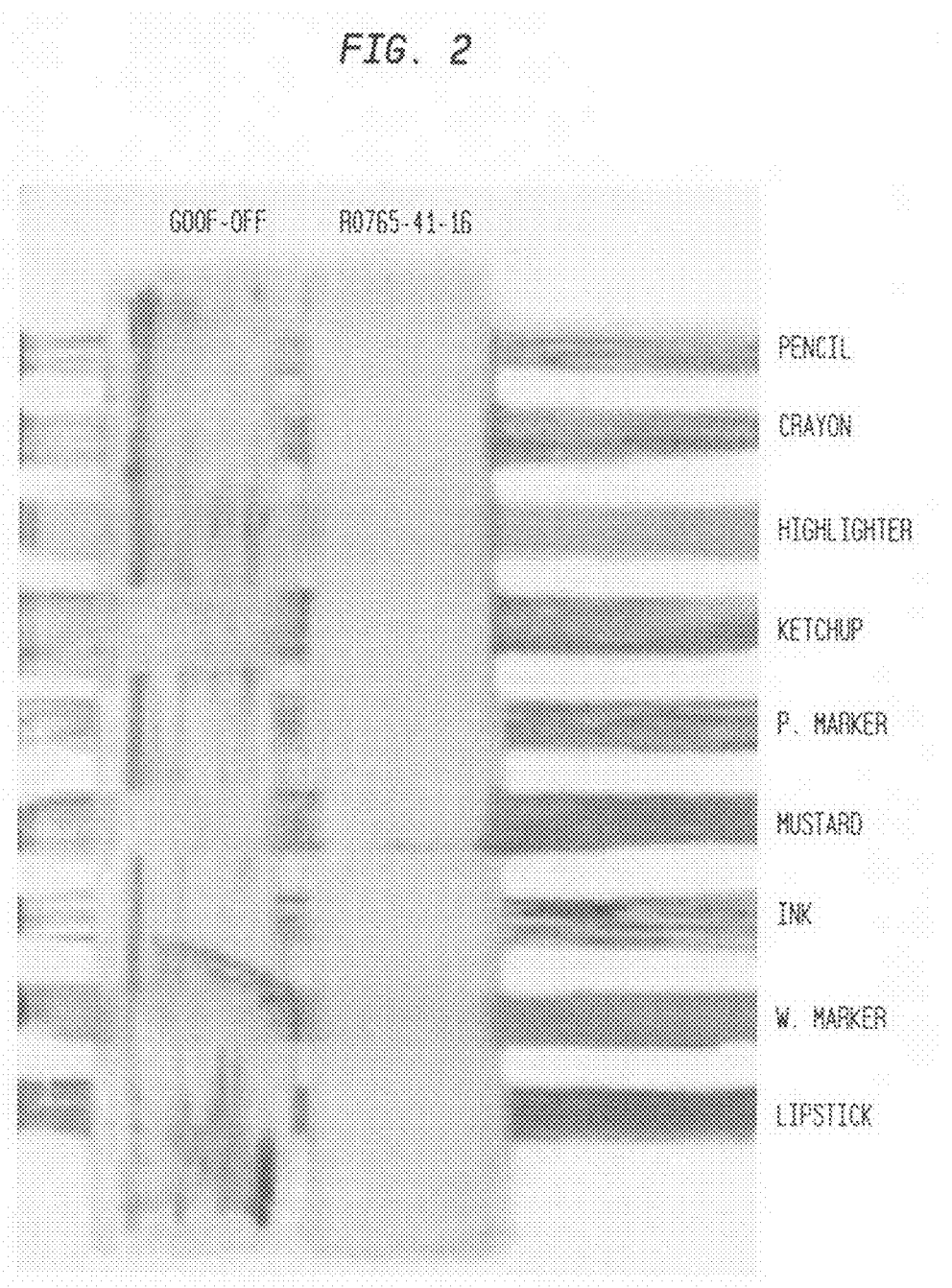

Table 2(b) corresponds to FIG. 2. Goof-Off® is believed to contain a composition of about, by weight of the total composition, 30-35% diethylene glycol monomethyl ether, 25-30% xylene isomers (c-, o-, p-) and 5-10% ethyl benzene. It was observed that Formulation R0765-41-16 removed stains at high cleaning or excellent cleaning (per the Legend) except with respect to the washable marker, which showed moderate cleaning. The Goof-Off® composition did not remove any of the stains more so relative to Formulation R0765-41-16 and, in fact, did not even slightly remove stains.

Example 3

TABLE 3(b)

Comparison between Formulation R0765-35-18
(Table 1(a)) and Goo-Gone ®
Comparison of Goo-Gone ® with Formulation
R0765-35-18 on High Gloss paint

| Stain type | Cleaning Efficiency of Goo-Gone ® | Cleaning Efficiency of Formulation R0765-35-18 |
|---|---|---|
| Pencil | 3 | 4 |
| Crayon | 3 | 4 |
| Highlighter | 2 | 4 |
| Ketchup | 1 | 4 |
| Permanent Marker | 1 | 4 |
| Mustard | 1 | 4 |
| Ink | 0 | 3 |
| Washable Marker | 0 | 4 |
| Lipstick | 3 | 4 |

Figure 3:
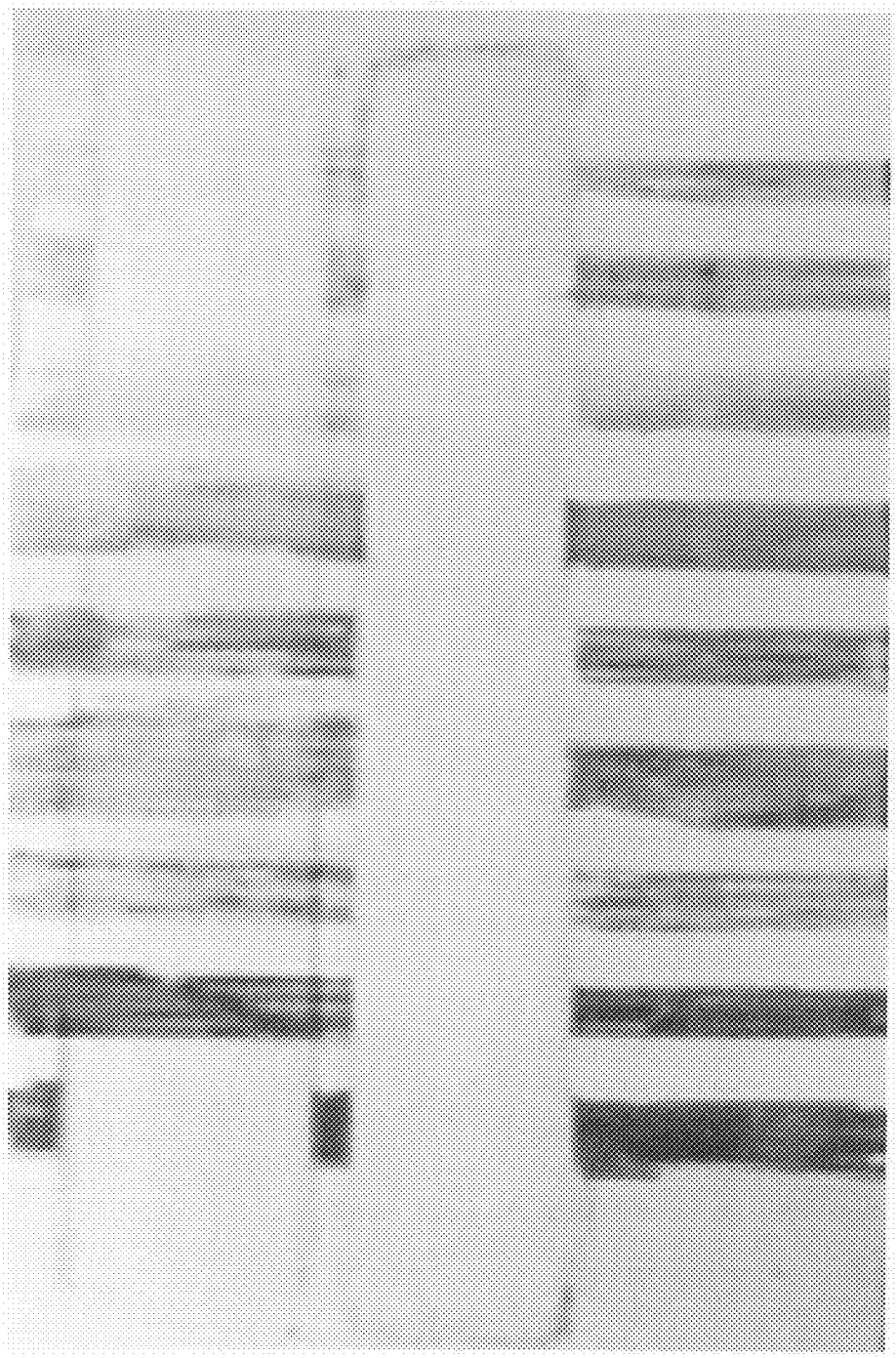
FIG. 3 is a photograph comparison of Goo-Gone™ with Formulation R0765-35-18 on high gloss paint.

Table 3(b) corresponds to FIG. 3. Goo-Gone® is believed to contain a mixture of a citrus oil or derivative and a petroleum solvent. It was again observed that Formulation 80765-35-18 removed all but one of the stains with excellent cleaning. The Goo-Gone® composition did not remove any of the stains more so relative to Formulation R0765-35-18.

Example 4

TABLE 4(b)

Comparison between R0765-41-16
(Table 2(a)) and Goo-Gone ®
Comparison of Goo-Gone ® with Formulation
R0765-41-16 on Low Gloss paint

| Stain type | Cleaning Efficiency of Goo-Gone ® | Cleaning Efficiency of Formulation R0765-41-16 |
|---|---|---|
| Pencil | 2 | 4 |
| Crayon | 3 | 4 |
| Highlighter | 1 | 3 |
| Ketchup | 1 | 4 |
| Permanent Marker | 0 | 3 |
| Mustard | 1 | 4 |
| Ink | 0 | 4 |
| Washable Marker | 0 | 2 |
| Lipstick | 2 | 4 |

Figure 4:
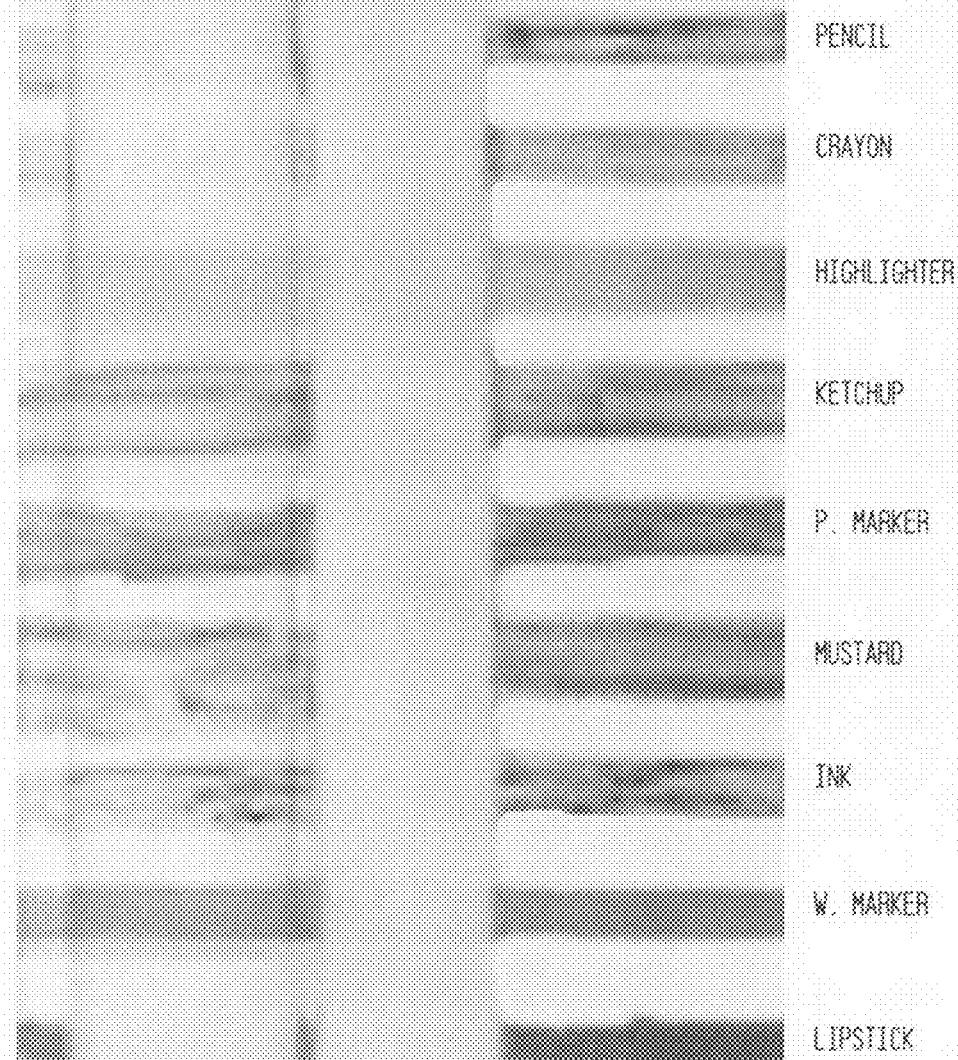
FIG. 4 is a photograph comparison of Goo-Gone™ with Formulation R0765-41-16 on low gloss paint.

Table 4(b) corresponds to FIG. 4. Goo-Gone® is believed to contain a mixture of a citrus oil or derivative and a petroleum solvent. It was again observed that Formulation 80765-41-16 removed the stains with high cleaning or excellent cleaning (per the Legend), with the exception of washable marker having moderate cleaning. The Goo-Gone® composition did not remove any of the stains more so relative to Formulation R0765-41-16.

Figure 5:
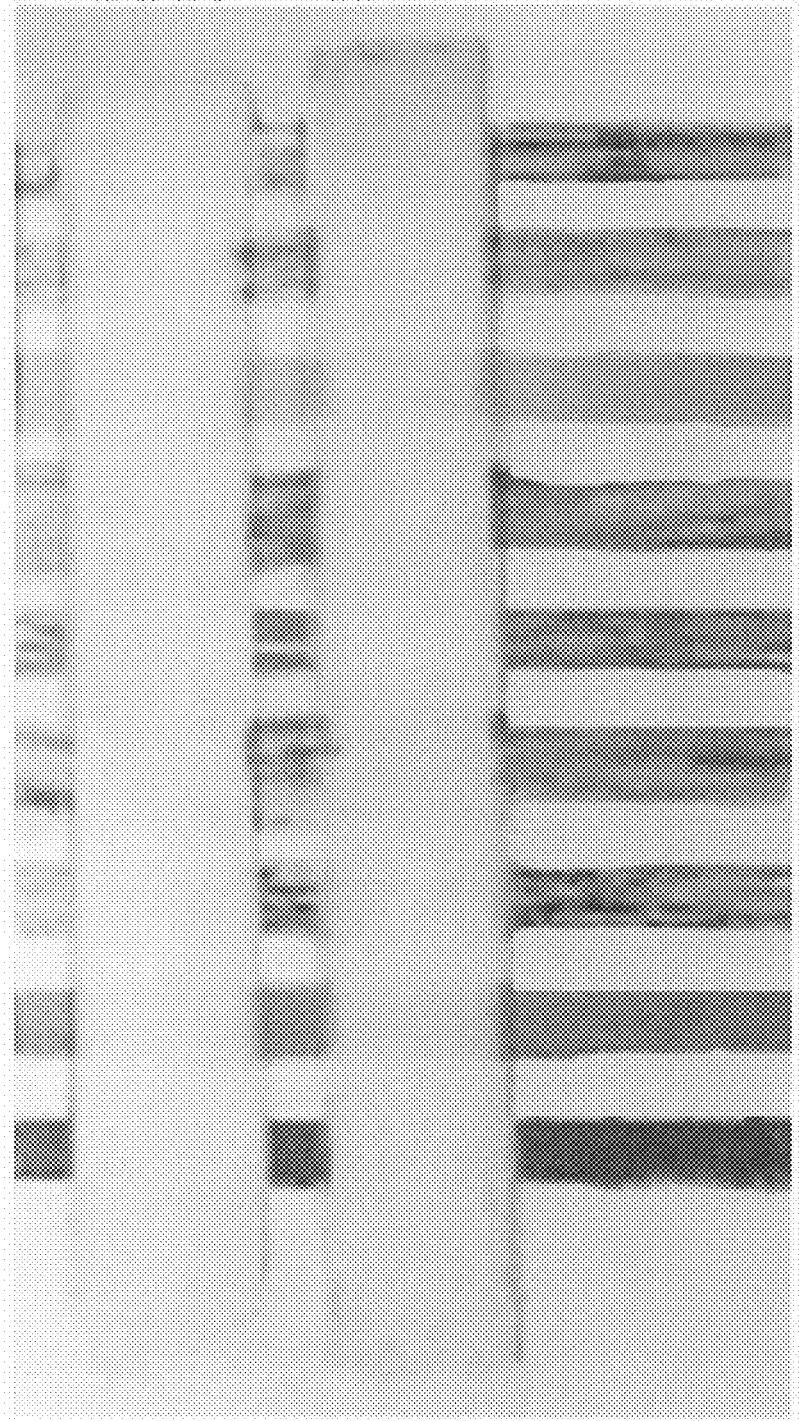
FIG. 5 is a photograph illustrating formulations containing Rhodiasolv™ DEE, d-limonene and Rhodasurf 91-6 on high gloss paint.
Figure 6:
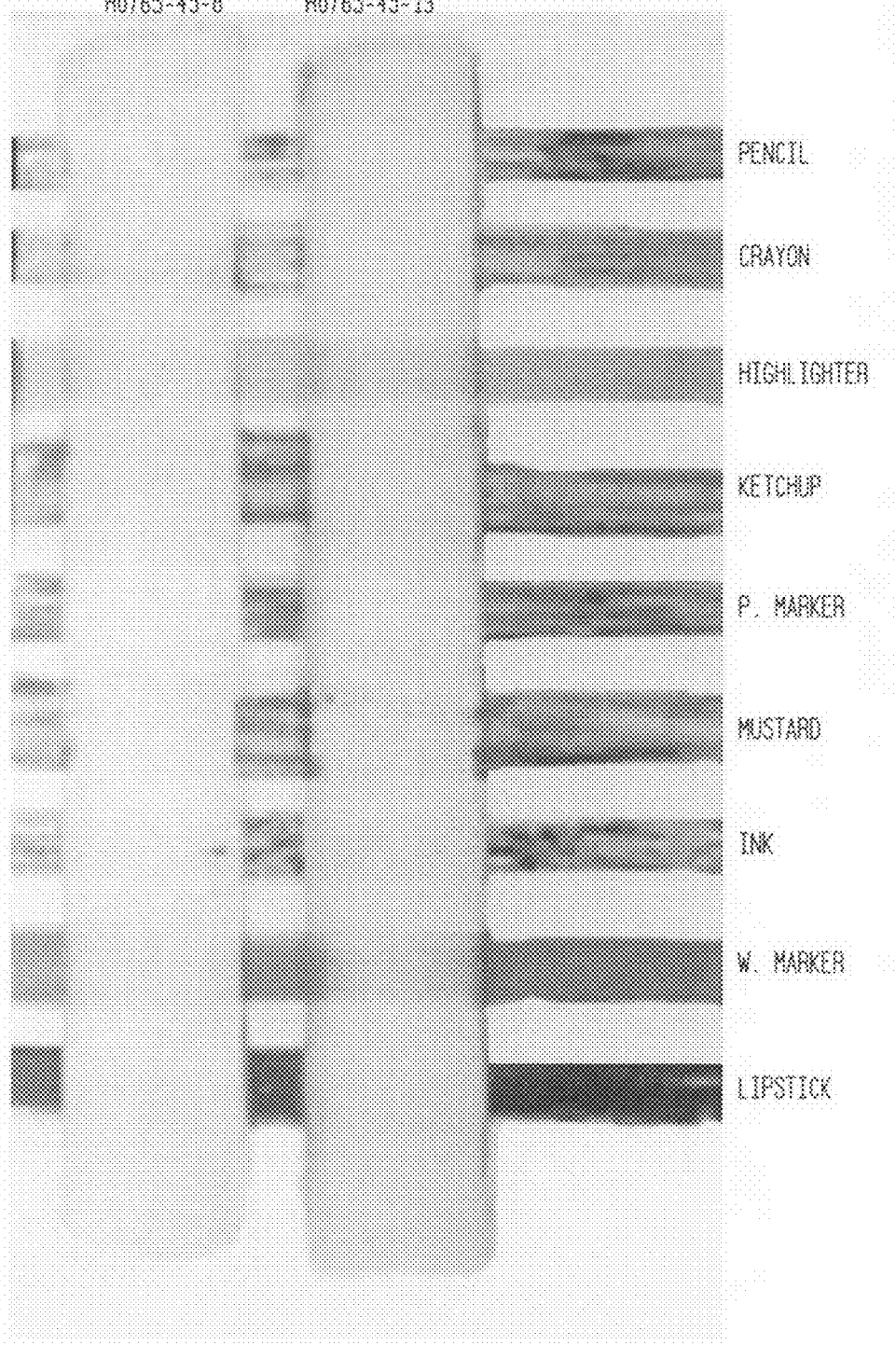
FIG. 6 is a photograph illustrating formulations containing Rhodiasolv™ DEE/m, d-limonene and Rhodasurf 91-6 on high gloss paint.

Tables 4(c) and 4(d) refer to FIGS. 5 and 6, respectively.

TABLE 4(c)

Formulation:

| R0765-31-10 | Amount-used (grams) |
|---|---|
| Rhodiasolv ® DEE | 9.79 gms |
| d-limonene | 10.24 gms |
| $C_8$-$C_{13}$ alcohol ethoxylate | 22.47 gms |
| Water | 57.50 gms |
| | 100.00 gms |

TABLE 4(d)

Formulation

| R0765-45-13 | Amount used (grams) |
|---|---|
| Rhodiasolv ® DEE/M | 9.84 gms |
| d-limonene | 9.85 gms |
| $C_8$-$C_{13}$ alcohol ethoxylate | 24.04 gms |
| DI Water | 56.27 gms |
| | 100.00 gms |

Plastic Substrate Cleaning Examples

Experimental work leading to the present invention in this particular embodiment are described in the following Tables. Samples were prepared by mixing ingredients under constant agitation. The formulations was allowed to sit for 24 hours before using in applications. The formulation gave a very clear solution, as follows:

TABLE 5

Formulation

| R0765-35-18 | |
|---|---|
| Rhodiasolv ® Iris | 28.73 gms |
| d-limonene | 7.73 gms |
| $C_8$-$C_{13}$ alcohol ethoxylate | 34.73 gms |
| water | 28.81 gms |
| | 100.00 gms |

Experiments were carried out as follows:

The plastic substrates were cleaned with a cotton cloth piece to remove dirt from the substrates. Sharpie® permanent marking pens were used to make one or more straight line marking on the substrates. About 5 minutes were allowed for the ink to dry. A cotton cloth piece was placed on paint brush and tape was used to secure it to the paint brush. 1 ml of formulation R0765-35-18 was placed on the cotton cloth and rubbed against the substrate to remove the marking. The procedure was repeated two times. A dry cotton cloth was used for last run to remove excess formulation. Observations were made for cleaning of the markings from the surface of the plastic substrates.

Commercial product EXPO® (manufactured by Sanford Brands) was used as a control. It is believed that EXPO® contains Butyl cellosolve and Isopropyl Alcohol solvents. Formulation R0765-35-18 was used to check performance against this control.

Four plastic substrates were used, namely, ABS (Acrylonitrile butadiene styrene), PP (Polypropylene), PC (Polycarbonate) and PVC (Polyvinyl Chloride). Sharpie® Black and Red Permanent markers were used for the experiment.

The results are as follows.

TABLE 6

R0765-35-18

| Substrate | Red Marking Pen | Black Marking Pen |
|---|---|---|
| PVC | 5 | 5 |
| PP | 5 | 5 |
| PC | 5 | 5 |
| ABS | 4 | 5 |

TABLE 7

Control (EXPO ®)

| Substrate | Red Marking Pen | Black Marking Pen |
|---|---|---|
| PVC | 4 | 4 |
| PP | 5 | 5 |
| PC | 5 | 5 |
| ABS | 3 | 3 |

TABLE 8

| Legend | |
|---|---|
| Ranking | Performance |
| 5 | No color or marking |
| 4 | Slight color or marking |
| 3 | Colored marking |
| 2 | Significant colored marking |
| 1 | No change from initial colored marking |

From the results, the formulation of the present invention show improved cleaning with respect to ABS (Acrylonitrile butadiene styrene) and PVC (Polyvinyl Chloride).

Textile Cleaning Examples

Figure 9:
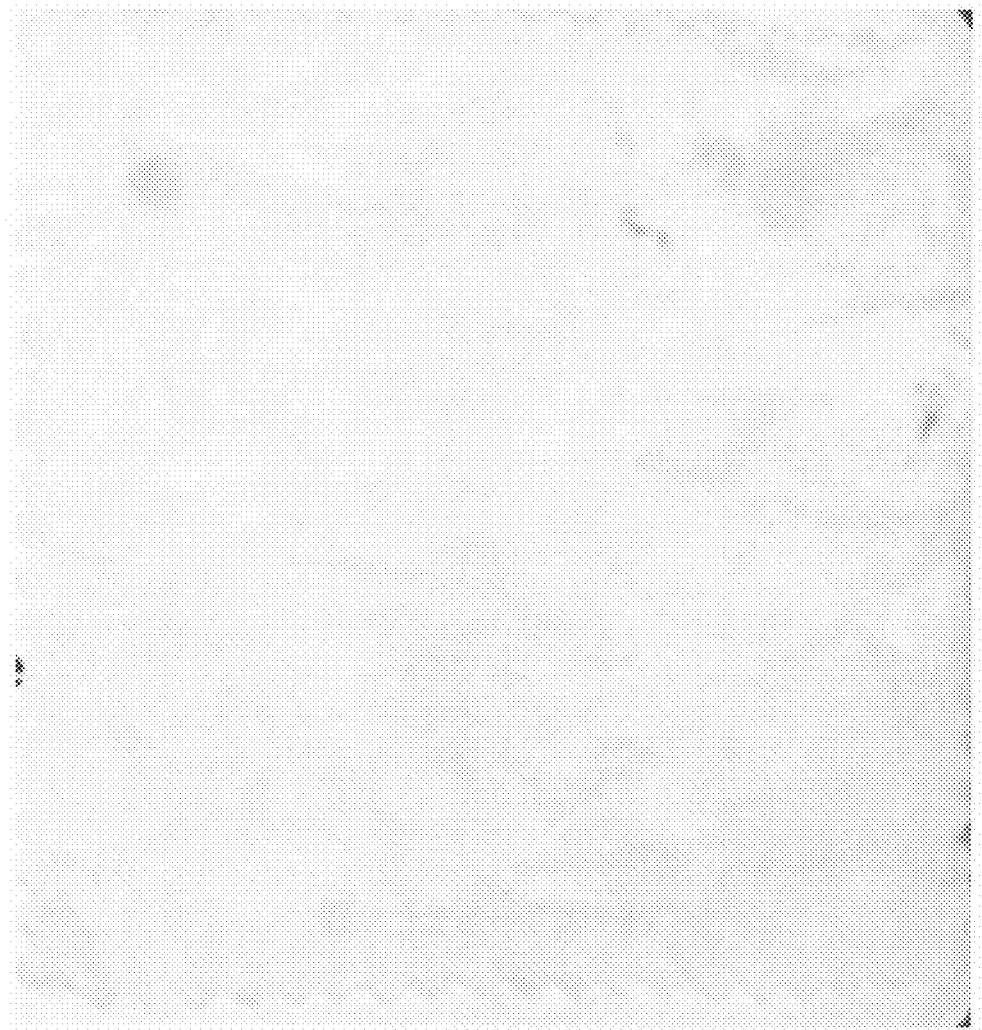
FIG. 9 is a photograph illustrating results using the textile spot-stain cleaner of the present invention, formulation R0729-22-1C (after a water wash).

Experimental work leading to the present invention in this particular embodiment are described in the following Tables. Samples were prepared by mixing ingredients under constant agitation. Formulations were allowed to sit for 24 hours before using in applications. FIG. 9 corresponds to the formulation described in Table 11. The formulations described herein give very clear solutions.

Figure 7:
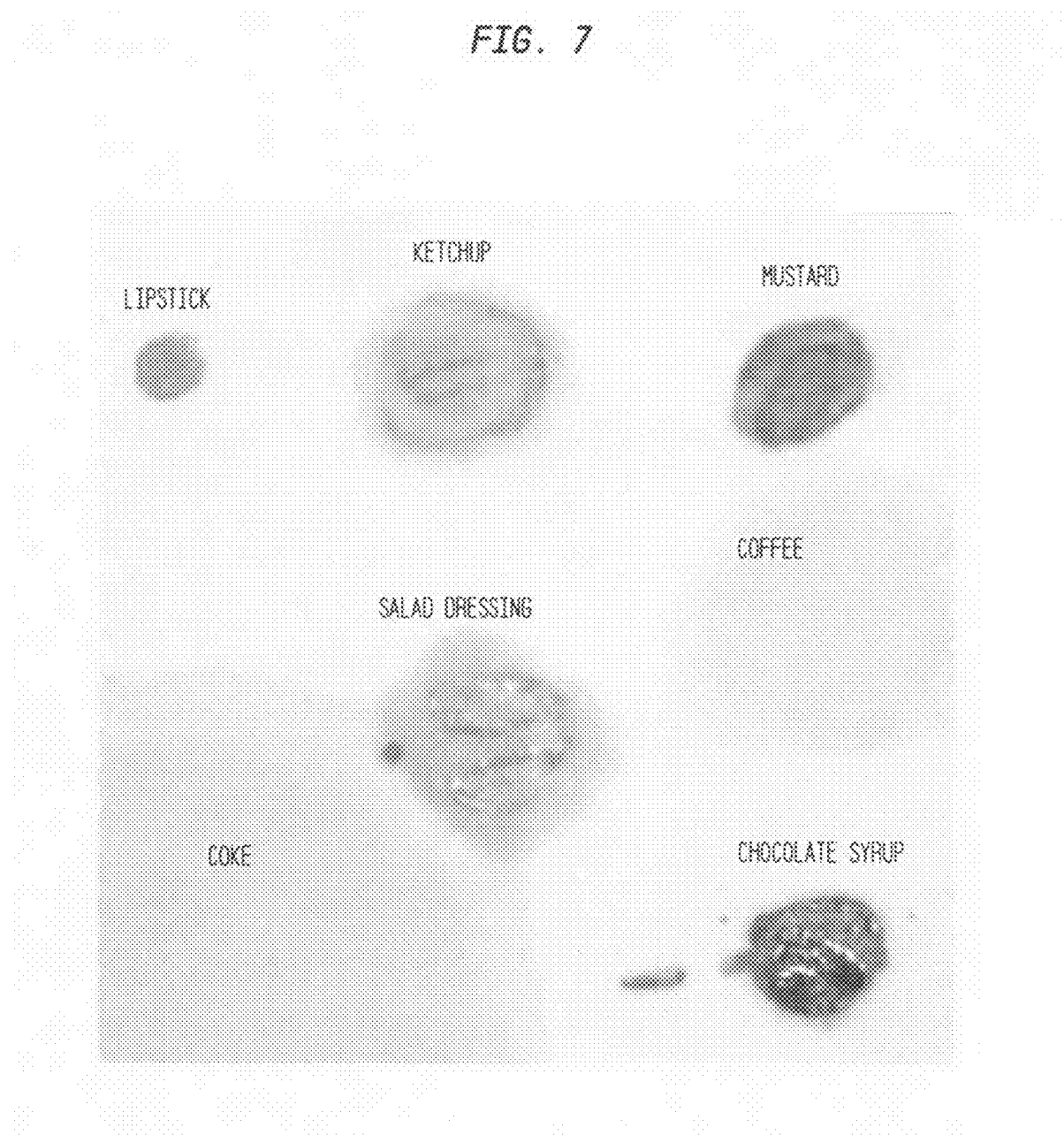
FIG. 7 is a photograph showing various stains on cotton cloth.
Figure 8:
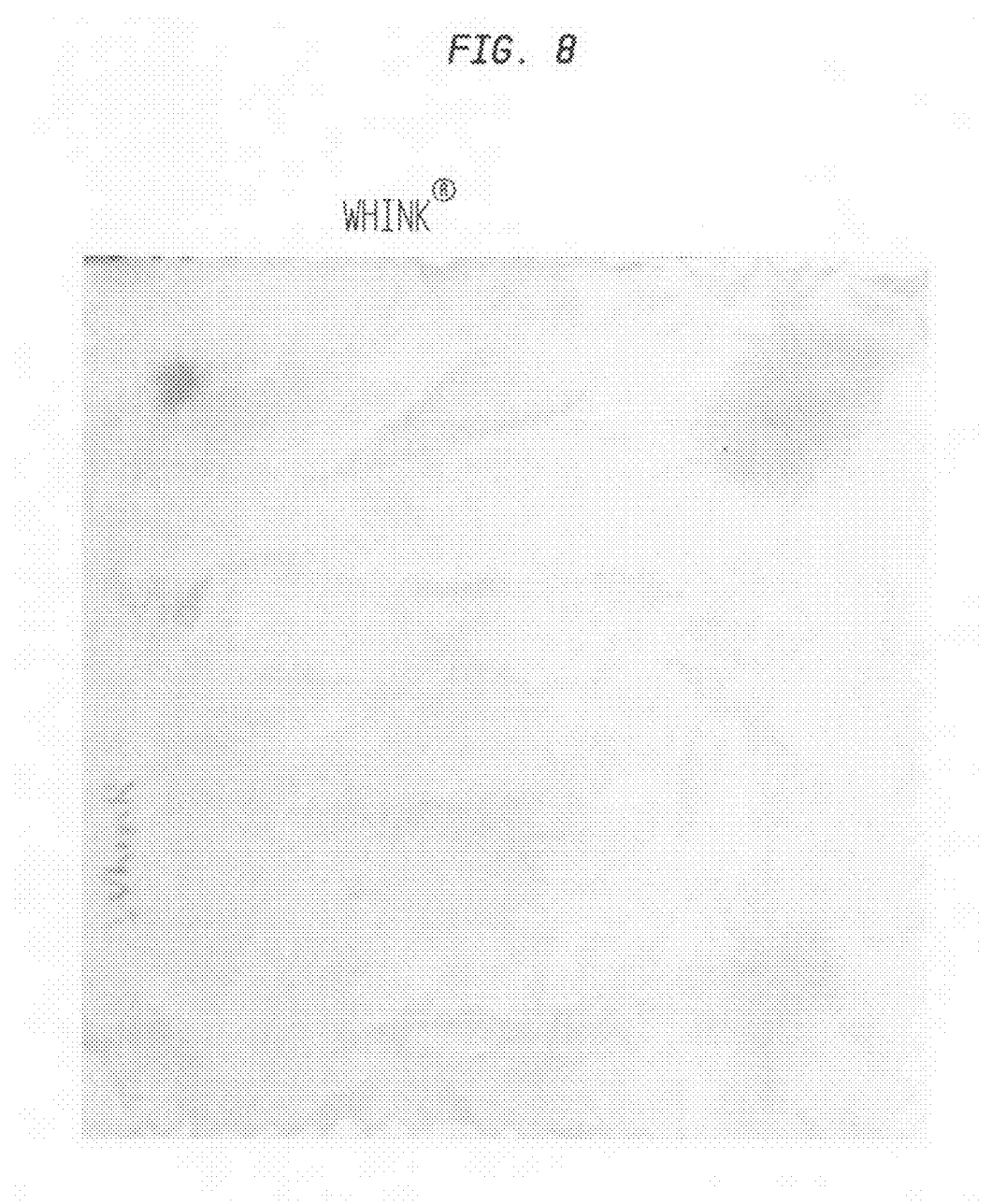
FIG. 8 is a photograph illustrating results using Whink™ as a textile spot-stain cleaner (after a water wash).

Experiments were carried out as follows:

A cotton cloth was placed on a hard surface. Referring to FIG. 7, various stains such as cola, coffee, ketchup, mustard, lipstick, etc. were applied on the cotton cloth. These stains were allowed to sit on cotton cloth for approximately 24 hours. Excess amount of stain was removed with a wooden spatula. Formulation drops (10-30 drops) corresponding to the tables below were applied to the stains such that the entire or a substantial amount of the stain was covered. Whink® laundry stain remover was used as a control. (Whink® is believed to be a mixture of 1-methyl-2-pyrrolidinone, isopropanol and water.) The stain with applied formulation was allowed to sit for an additional 15 minutes (approximately). After the stain was allowed to sit, the cloth was cleaned with mildly warm water. Referring next to FIG. 8, the cotton cloth was allowed to dry for observation.

Following are results from formulations containing Rhodiasolv® Iris, a terpene EO/PO, a $C_8$-$C_{13}$ alcohol ethoxylate, d-Limonene and/or DI water.

Formulations:

TABLE 9

| R0729-22-1A | |
|---|---|
| Rhodiasolv ® Iris | 6.17 gms |
| Terpene EO/PO | 0.20 gms |
| $C_8$-$C_{13}$ alcohol ethoxylate | 7.45 gms |
| DI Water | 6.18 gms |
| | 20.00 gms |

TABLE 10

| R0729-22-1B | |
|---|---|
| Rhodiasolv ® Iris | 5.92 gms |
| Terpene EO/PO | 1.00 gms |
| $C_8$-$C_{13}$ alcohol ethoxylate | 7.15 gms |
| DI Water | 5.93 gms |
| | 20.00 gms |

TABLE 11

| R0729-22-1C | |
|---|---|
| Rhodiasolv ® Iris | 5.60 gms |
| Terpene EO/PO | 2.00 gms |
| $C_8$-$C_{13}$ alcohol ethoxylate | 6.77 gms |
| DI Water | 5.62 gms |
| | 20.00 gms |

TABLE 12

| R0729-22-1D | |
|---|---|
| Rhodiasolv ® Iris | 5.29 gms |
| Terpene EO/PO | 3.00 gms |
| $C_8$-$C_{13}$ alcohol ethoxylate | 6.38 gms |
| DI Water | 5.33 gms |
| | 20.00 gms |

TABLE 13

| R0765-35-18 | |
|---|---|
| Rhodiasolv ® Iris | 28.73 gms |
| D-limonene | 7.73 gms |
| $C_8$-$C_{13}$ alcohol ethoxylate | 34.71 gms |
| DI Water | 28.83 gms |
| | 100.00 gms |

TABLE 14

| R0765-41-16 | |
|---|---|
| Rhodiasolv ® Iris | 10.38 gms |
| d-limonene | 10.37 gms |
| $C_8$-$C_{13}$ alcohol ethoxylate | 21.01 gms |
| DI Water | 58.24 gms |
| | 100.00 gms |

Ink Cleaning Examples

Example 1

Saturated hydrocarbon (Isopar L™)

Figure 10:
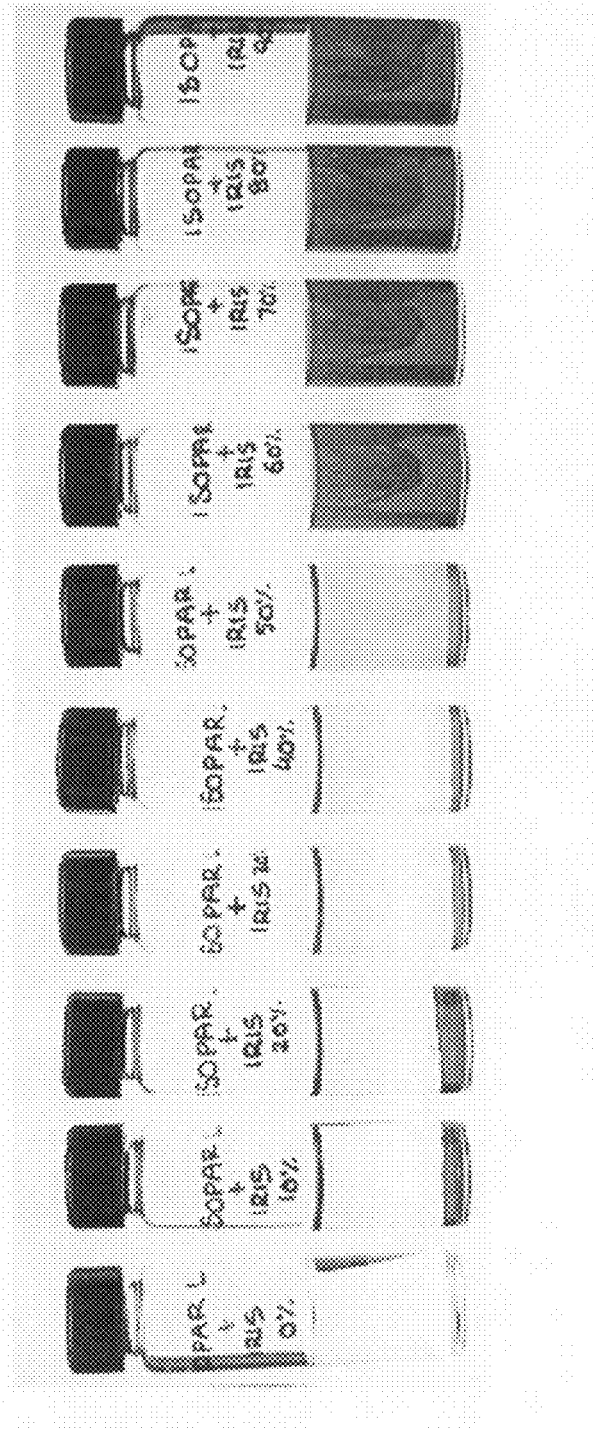
FIG. 10 is a photograph showing the solubility of UV ink in blends of IsoparL and MGN blends (IRIS) of the present invention.

Isopar L™ (CAS No. 64742-48-9) is a high boiling mixture of hydrotreated alkanes from Exxon with a described flash point of 64° C. and an evaporation rate of 6 (nBuAc=100). The solubility of UV Curable ink Nuvaflex™ 3003 (Cyan) from Zeller Gmellin was studied when Isopar™ L was blended with a blend of MGN esters according to the present invention as shown in FIG. 1. Samples were prepared by dispensing aliquots (5 mL) of solvent blends into a series of vials with a progressive variation in MGN blend content. Referring to FIG. 10, FIG. 10 shows that Isopar™ L is miscible with the said blend of MGN esters for the entire composition range. A drop of ink (0.012-0.015 g) was added to the solvent blend which sinks and deposits on the bottom of the vial. The solution was then mixed by repeated aspiration of 0.5 ml of the solvent with a micropipette 5 times. The solution was then allowed to stand for at least 24 hr. The ink is insoluble in neat Isopar L™. Increasing the MGN blend content increases the solubility of ink the blend. The cross over to complete solubility based on FIG. 10 occurs between 60-70% MGN blend content. The data shows that saturated hydrocarbons are not effective for dissolution and hence cleaning of UV Curable ink alone. It is believed that blending with the MGN blend of the present invention may enhance the solubility of UV Inks in Isopar™ L based formulations.

Example 2

Unstaurated Hydrocarbon (Hisol™ 70R)

Figure 11:
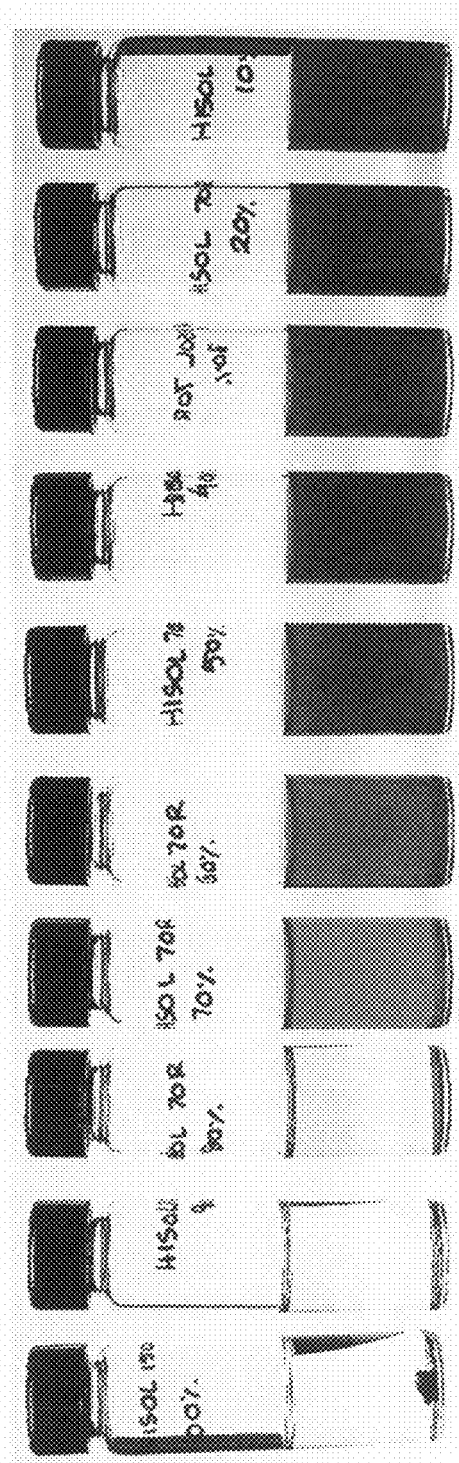
FIG. 11 is a photograph showing the solubility of UV ink in blends of Histol 70R and MGN blends (IRIS) of the present invention.

Hisol™ 70R is an aromatic solvent with a described high evaporation rate compared to Isopar™ L. The solubility of UV Curable ink Nuvaflex™ 3003 (Cyan) from Zeller Gmellin was studied when the solvent (Hisol™ 70R) was blended with the MGN blend as photographically shown in FIG. 11. Samples were prepared by dispensing aliquots (5 mL) of solvent blends into a series of vials with a progressive variation in MGN blend content. A drop of ink (0.012-0.015 g) was added to the solvent blend which sinks and deposits on the bottom of the vial. The solution was then mixed by repeated aspiration of 0.5 ml of the solvent with a micropipette 5 times. The solution was then allowed to stand for at least 24 hr. It was observed that the ink is insoluble in Hisol™ 70R alone. Addition of the MGN blend of the present invention improves the solubility of ink with the crossover to complete solubility with an optically dense solution occurring between 30-40% MGN blend content.

Example 3

Oxygenated Solvents: Methyl Oleate (Fatty Acid Methyl Ester, also known as FAME)

Figure 12:
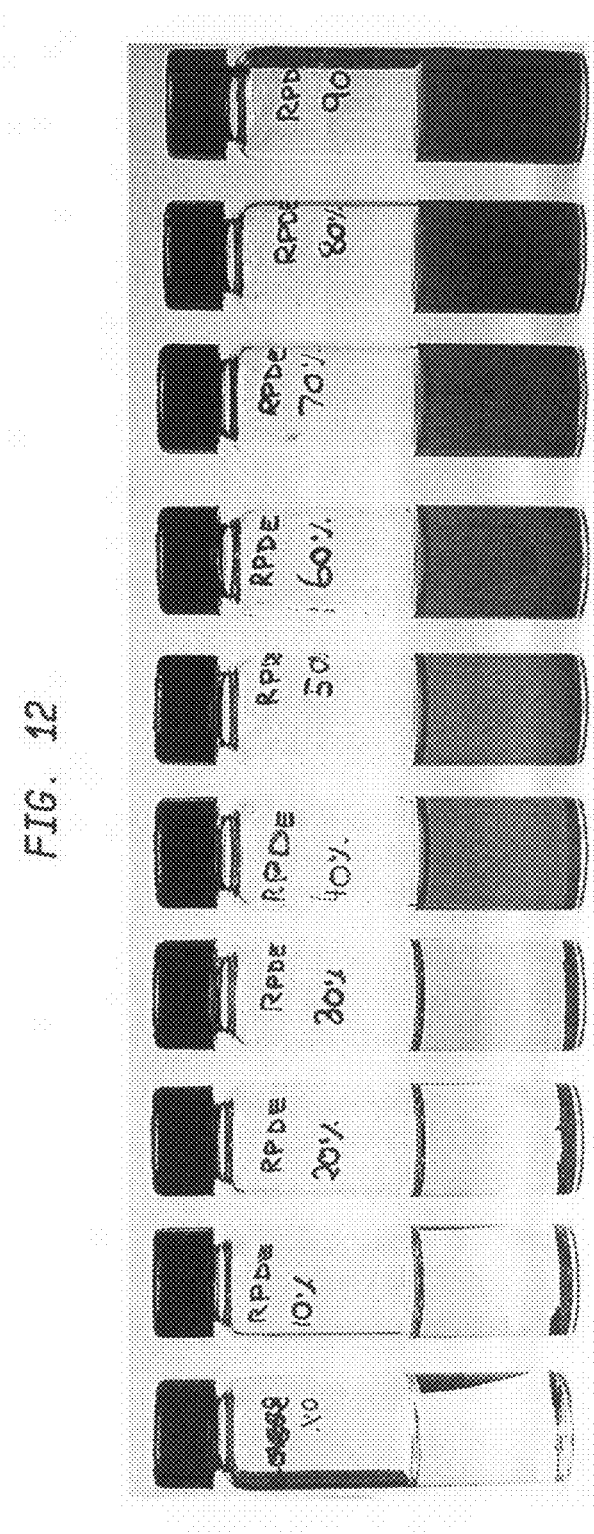
FIG. 12 is a photograph showing the solubility of UV ink in blends of Me-Oleate and the AGS blend of the present invention.

Fatty acid methyl esters sourced from various vegetable oils are touted to be more environmentally friendly which can replace some of the hazardous solvents used in the printing ink industry. Soy methyl esters (Methyl Soyate), Tall Oil mono-methyl esters are some examples of these environmentally-friendly solvents. These solvents, however, may not have the necessary solvency or the dissolution rates that are necessary at times for application in the printing industry. Methyl Oleate ($C_{18}$ insaturated FAME) is one of the key ingredients of most such mono-methyl esters derived from disparate sources. Methyl oleate from Novance Inc (Phytorob™ 960.65) was used in this study. The solubility of UV Curable ink Nuvaflex™ 3003 (Cyan) from Zeller Gmellin was studied when the solvent (Me-Oleate) was blended with a particular dibasic ester blend AGS of the present invention (dimethyl glutarate/succinate/adipate blend=63/24/13) as photographically shown in FIG. 12. Samples were prepared by dispensing aliquots (5 mL) of solvent blends into a series of vials with a progressive variation in AGS blend content. A drop of ink (0.012-0.015 g) was added to the solvent blend which sinks and deposits on the bottom of the vial. The solution was then mixed by repeated aspiration of 0.5 ml of the solvent with a micropipette 5 times. The solution was then allowed to stand for at least 24 hr. It was observed that the ink is not soluble in Me-Oleate. Based on the optical contrast as shown in FIG. 12 the crossover to complete solubility of ink occurs at 50-60% AGS blend content.

Figure 13:
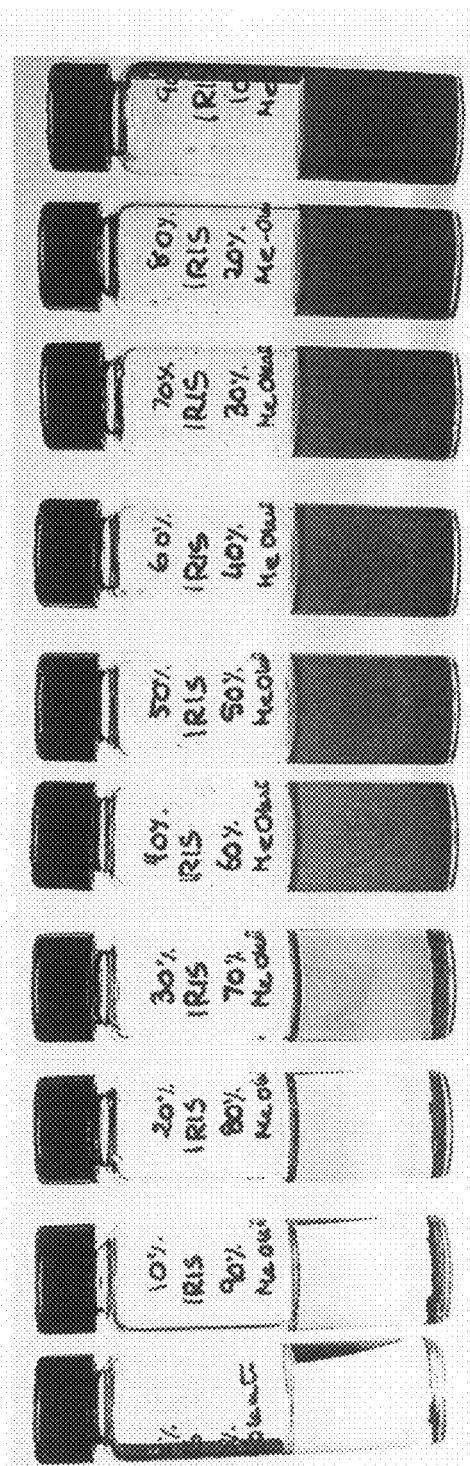
FIG. 13 is a photograph showing the solubility of UV ink in blends of Me-Oleate and the MGN blend of the present invention.

As photographically illustrated in FIG. 13, the experiment above was repeated with an MGN blend of the present invention (primarily dimethyl methyl-glutatrate). The two experiments show dissolution of ink compared to FAMEs (Fatty acid methyl esters). The crossover to complete solubility of the ink occurs at 30-40% MGN blend content. This is a sharper transition when compared to the more gradual change seen for the AGS blend.

Water Based Ink Cleaners

To further improve the environmentally friendly profile, formulations of MGN blends with surfactants may also be used to disperse the solvent in an aqueous emulsion to be used for cleaning printing inks.

Example 4

MGN Blend in Aqueous Formulation

Rhodiasolv IRIS™ (an embodiment of the MGN blend of the present invention) was formulated with surfactants (IRIS AQ-1) with the following composition:

TABLE 15

| | |
|---|---|
| Rhodiasolv IRIS | 28.73 |
| Terpene EO/PO | 7.73 |
| $C_8$-$C_{13}$ alcohol ethoxylate | 34.71 |
| DI Water | 28.83 |
| | 100.00 |

Figure 14:
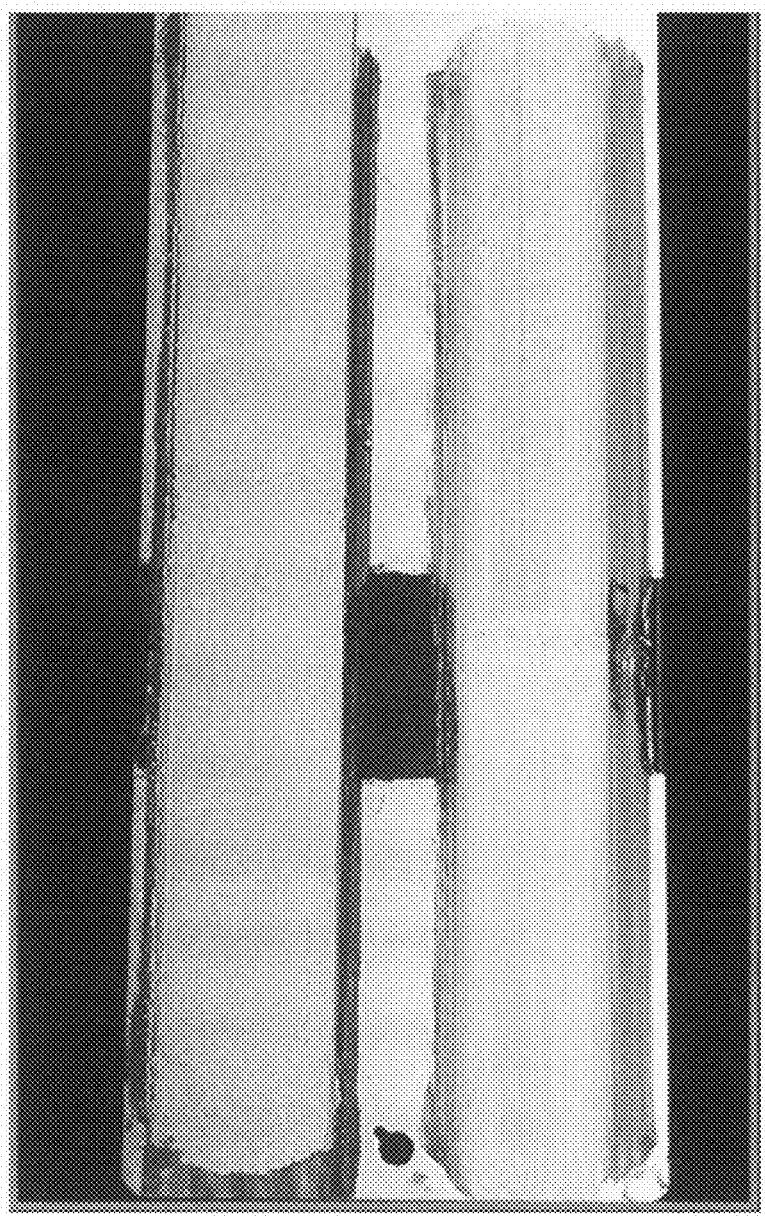
FIG. 14 is a photograph comparing ink cleaning of an aqueous formulation of the present invention (IRIS) and the benchmark.

The formulation yields a clear microemulsion that may be used for cleaning printing ink. A comparison of cleaning efficiency with a benchmark "eco-friendly"-touted cleaner used in the industry is shown below. As photographically illustrated in FIG. 14, the benchmark is used for cleaning in Flexographic UV Printing (i.e., FlexoCleanersUV Plus Strong & Safe) as an Anilox Roll and Ink Cleaner. The benchmark has a citrus odor and the MSDS lists nonyl-phenol ethoxylate (<9%) as the surfactant.

The example was tested on a Gardner Scrub Tester with a cotton Swab soaked in cleaner (1mL) rubbed 20 times across ink film per cycle. The test was performed for 2 cycles in each case. It was observed that the IRIS microemulsion (IRIS AQ-1) dissolved ink rapidly in cycle 1.

Example 5

IRIS in Aqueous Formulation

Figure 15:
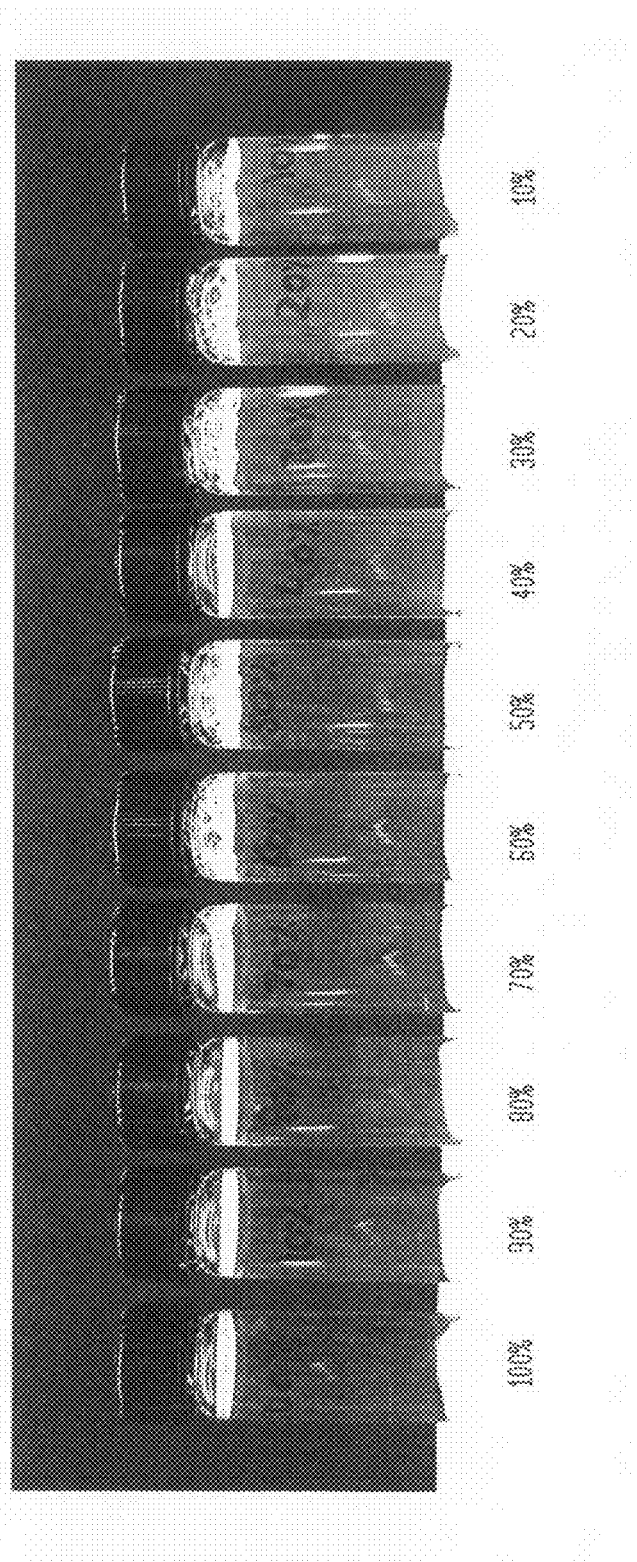
FIG. 15 is a photograph illustrating that dilution of the present invention (IRIS AQ-2) shows stable emulsions at different dilution levels.

In order to make an aqueous formulation that could be diluted to give stable emulsions, a new formulation was prepared with the following composition IRIS/Rhodasurf DA-630/Rhodaclean MSC (38/52/10) (Designated IRIS AQ-2) This can be diluted infinitely to give stable emulsion at room temperature as shown in FIG. 15.

A dilution of IRIS AQ-2 was prepared for ink cleaning formulation as below (Designated IRIS AQ-3).

TABLE 16

| | |
|---|---|
| Rhodiasolv Iris | 9.50 |
| Rhodoclean MSC | 2.50 |
| C8-C13 alcohol ethoxylate | 13.00 |
| DI Water | 75.00 |
| | 100.00 |

Figure 16:
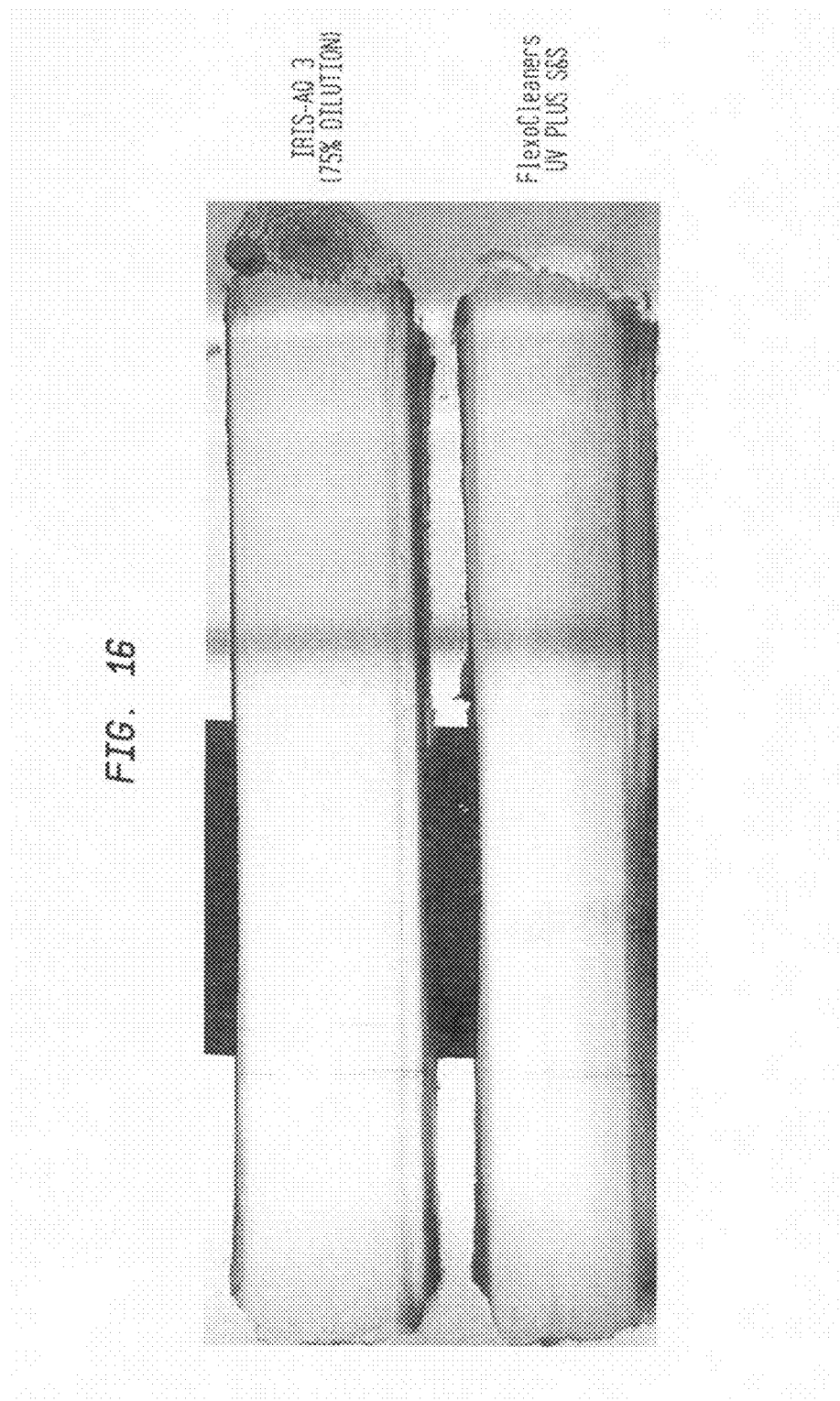
FIG. 16 is a photograph illustrating Gardner scrub-testing of the present invention (IRIS AQ-3) compared with a benchmark.

This composition was used for ink cleaning as compared to the commercial benchmark. As photographically illustrated in FIG. 16, this was tested as above with the Gardner scrub tester through 3 cycles of 20 strokes (1 ml of cleaner per cycle) followed by a dry cotton swab (1 cycle). The figure below highlights that IRIS AQ-3 clearly outperforms the benchmark and cleans the substrate more effectively of UV Ink.

The formulation obtained is biodegradable and is an effective environmentally friendly printing ink cleaner with solvent content <100 g/L.

Stability Experiments.

TABLE 17

Formulation R0815-062-07 for testing hydrolytic stability

| DV-9015/R0815-062-07 | Amount used (grams) |
|---|---|
| Rhodiasolv ® Iris | 28.73 gms |
| Terpene EO/PO | 7.73 gms |
| C$_8$-C$_{13}$ alcohol ethoxylate | 34.74 gms |
| Water | 28.8 gms |
| | 100 gms |

DV-9015, R0815-062-07, was prepared and monitored according the description below. DV-9015 sample stability was been monitored at 38° C. for a 100 days and at room temperature for 1 year period. The methanol and moisture concentrations are been determined using a standard addition headspace Gas chromatography and Karl Fisher respectively. The sample was placed on scintillation vials for the moisture study and on sealed headspace vials (two for each analysis day) for the methanol experiment. Some vials were placed in an oven set at 38° C. and others stored at room temperature.

The moisture measurement were acquired using a 870 Karl Fisher Titrino Plus. Fifty microliter of sample were placed on the titration cell and titrated using a standardized Composite 5 solution. The sample was analyzed three times each testing day.

The methanol concentration was obtained using a standard addition method. A Gas Chromatograph (GC Agilent 6890A) equipped with a flame ionization detector (FID) was used. Sample vials were equilibrated at 45° C. for 15 min in the headspace oven, and then injected into a DB-1 (30 m×0.32 mm×1 µm) column. The column was initially kept at 40° C. for 8 min, and then the temperature was raised at 40° C./min rate to 200° C. After a little over six months the sample was still a clear emulsion and the pH has only drifted 0.3 pH units.

Referring to FIG. 17, the formulations have some hydrolysis propensity—the ester will hydrolysis and produced the acid form and methanol. Methanol generation was monitored and correlated to the hydrolysis of the dibasic ester of the present invention. FIG. 17, illustrates the methanol concentrations for the first 8 weeks, where the diamonds represent the concentrations at room temperature and circles represent samples at 38° C. Methanol concentration has been stable at between 250 ppm to about 190 ppm, typically around 210 ppm. The water content has been constant, at about 30%.

TABLE 18

Formulation R0765-35-18 for testing hydrolytic stability

| R0765-35-18 | Amount used (grams) |
|---|---|
| Rhodiasolv ® Iris | 28.73 gms |
| d-limonene | 7.73 gms |
| C$_8$-C$_{13}$ alcohol ethoxylate | 34.73 gms |
| Water | 28.81 gms |
| | 100 gms |

Referring to Table 18, DV-9001, R0765-035-18, sample was prepared similar to the DV-9015 sample above and set aside. After over a year the sample remained a clear emulsion and the pH dropped less than one unit.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A method of cleaning a surface having ink comprising: (a) providing a cleaning composition comprising: (a) a blend of dibasic esters consisting of (i) a dialkyl methylgutarate and (ii) at least one of a dialkyl adipate or a dialkyl ethylsuccinate; and (b) at least one surfactant selected from the group consisting of an anionic surfactant, a cationic surfactant, an amphoteric surfactant, a zwitterionic surfactant, a nonionic surfactant and any combination thereof; (b) contacting the cleaning composition with a surface having ink on it, and (c) removing the used cleaning composition from the cleaned surface.

2. The method of claim 1 wherein the cleaning composition is a microemulsion comprising from about 1% to about 55%, by weight of the cleaning composition, of a blend of dibasic esters, wherein the blend consists of:

(i) about 7-14%, by weight of the blend, a dibasic ester of formula:

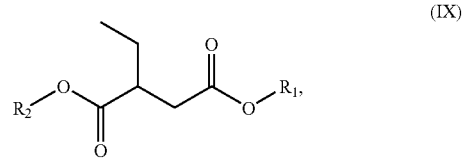

(IX)

(ii) about 80-94%, by weight of the blend, a dibasic ester of formula

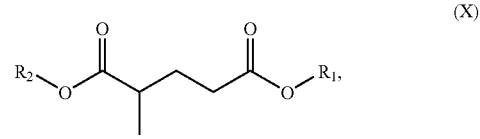

(X)

and (iii) about 0.5-5%, by weight of the blend, a dibasic ester of formula

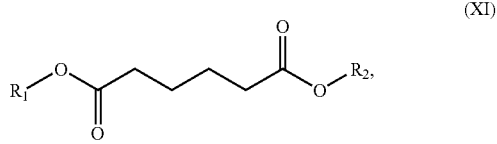

(XI)

wherein $R_1$ and $R_2$ individually comprise hydrocarbon groups selected from methyl, ethyl, propyl, isopropyl, n-butyl, pentyl, isoamyl, hexyl, heptyl or octyl.

3. The method of claim 1 wherein the ink is selected from the group consisting of UV inks, conventional inks, hybrid inks, water-based inks and any combination thereof.

4. A The method of claim 1 wherein the blend of dibasic esters consists of dialkyl adipate, dialkyl methylglutarate and dialkyl ethylsuccinate.

5. The method of claim 4 wherein the ink is selected from the group consisting of UV inks, conventional inks, hybrid inks, water-based inks and any combination thereof.

* * * * *